United States Patent
Hatano

(10) Patent No.: US 8,659,690 B2
(45) Date of Patent: Feb. 25, 2014

(54) SEMICONDUCTOR INTEGRATED CIRCUIT, IMAGING SYSTEM, AND SIGNAL CONVERSION METHOD

(75) Inventor: Toshinobu Hatano, Kyoto (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 13/180,128

(22) Filed: Jul. 11, 2011

(65) Prior Publication Data

US 2012/0008007 A1  Jan. 12, 2012

Related U.S. Application Data

(63) Continuation of application No. PCT/JP2009/000352, filed on Jan. 30, 2009.

(51) Int. Cl.
*H04N 3/14* (2006.01)
*H04N 5/335* (2011.01)

(52) U.S. Cl.
USPC ........... 348/294; 348/298; 348/302; 348/308; 348/312

(58) Field of Classification Search
USPC ......... 348/294–324; 250/208.1; 257/290–292
See application file for complete search history.

(56) References Cited

U.S. PATENT DOCUMENTS

| 6,781,107 B2 * | 8/2004 | Aibara et al. ............. 250/208.1 |
| 2004/0182992 A1 | 9/2004 | Aibara et al. |
| 2004/0189842 A1 | 9/2004 | Aibara et al. |
| 2005/0092898 A1 | 5/2005 | Aibara et al. |

FOREIGN PATENT DOCUMENTS

| JP | 2002-300591 | 10/2002 |
| JP | 2009-038559 | 2/2009 |

* cited by examiner

*Primary Examiner* — Yogesh Aggarwal
(74) *Attorney, Agent, or Firm* — McDermott Will & Emery LLP

(57) ABSTRACT

An adjacent color difference data generator calculates a differential between adjacent data in a data row having different color information per pixel of the digital signal to thereby generate a first color difference data having a first code format. A code converter converts the first color difference data into a second color difference data having a second code format. The second code format is a code format where only a small number of bits change before and after the code conversion from the first code format. The number of changing bits in the switching between codes when, for example, an image monochromatic but having gradation change is imaged to reduce any noise generated when digital image data is outputted.

16 Claims, 19 Drawing Sheets

F I G. 2
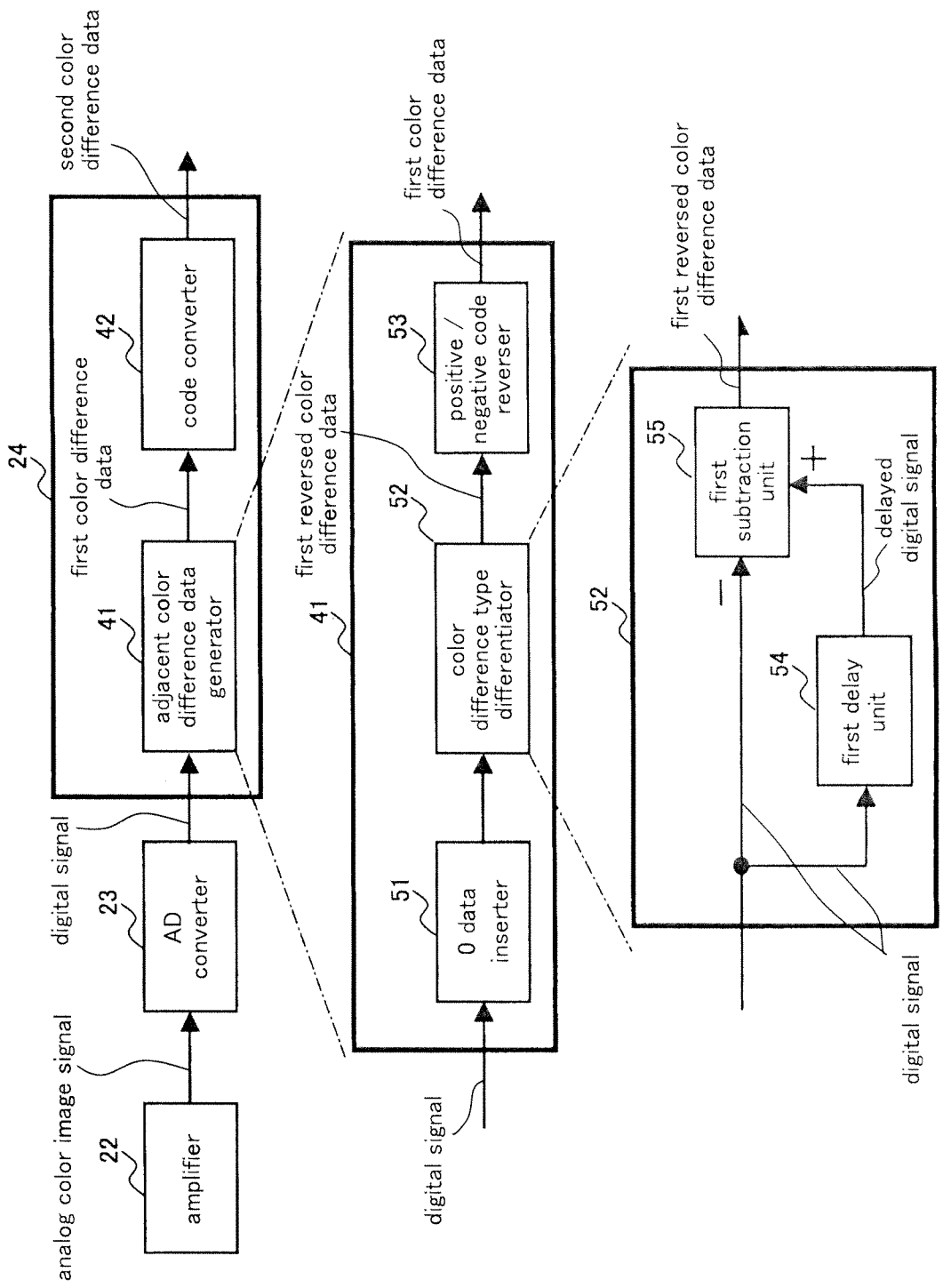

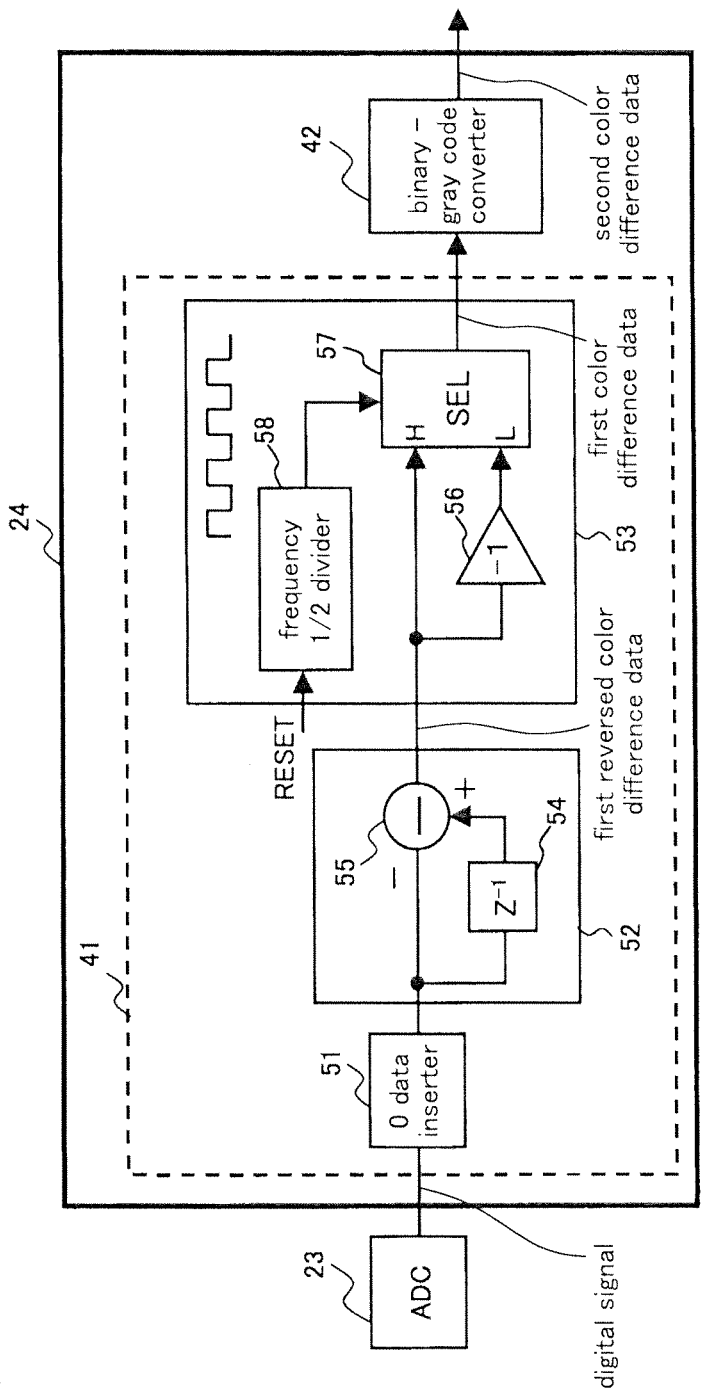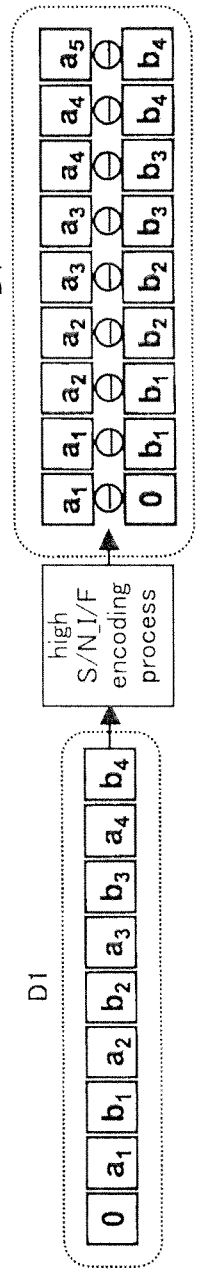
F I G. 3 A
F I G. 3 B

F I G. 6
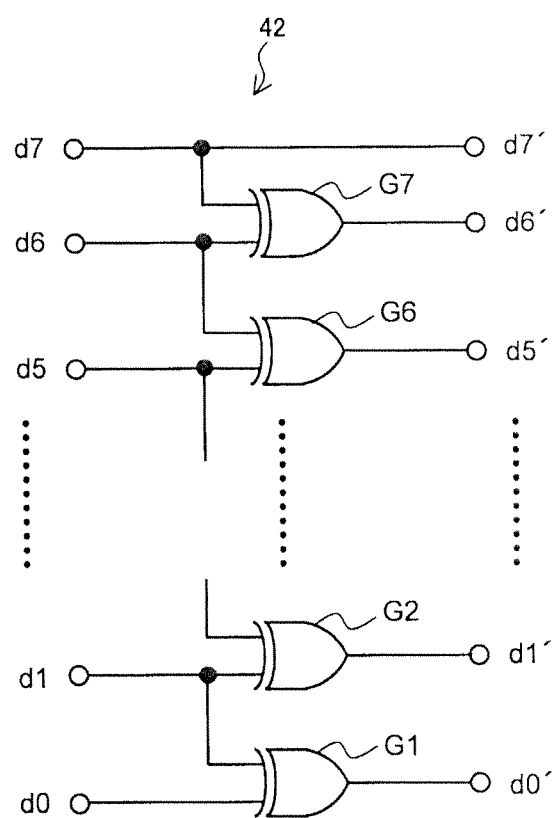

FIG. 9

| binary code | | | | | | | | base 10 | gray code | | | | | | | |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 | 1 |
| 0 | 0 | 0 | 0 | 0 | 0 | 1 | 0 | 2 | 0 | 0 | 0 | 0 | 0 | 0 | 1 | 1 |
| 0 | 0 | 0 | 0 | 0 | 0 | 1 | 1 | 3 | 0 | 0 | 0 | 0 | 0 | 0 | 1 | 0 |
| 0 | 0 | 0 | 0 | 0 | 1 | 0 | 0 | 4 | 0 | 0 | 0 | 0 | 0 | 1 | 1 | 0 |
| 0 | 0 | 0 | 0 | 0 | 1 | 0 | 1 | 5 | 0 | 0 | 0 | 0 | 0 | 1 | 1 | 1 |
| 0 | 0 | 0 | 0 | 0 | 1 | 1 | 0 | 6 | 0 | 0 | 0 | 0 | 0 | 1 | 0 | 1 |
| 0 | 0 | 0 | 0 | 0 | 1 | 1 | 1 | 7 | 0 | 0 | 0 | 0 | 0 | 1 | 0 | 0 |
| 0 | 0 | 0 | 0 | 1 | 0 | 0 | 0 | 8 | 0 | 0 | 0 | 0 | 1 | 1 | 0 | 0 |
| 0 | 0 | 0 | 0 | 1 | 0 | 0 | 1 | 9 | 0 | 0 | 0 | 0 | 1 | 1 | 0 | 1 |
| 0 | 0 | 0 | 0 | 1 | 0 | 1 | 0 | 10 | 0 | 0 | 0 | 0 | 1 | 1 | 1 | 1 |
| 0 | 0 | 0 | 0 | 1 | 0 | 1 | 1 | 11 | 0 | 0 | 0 | 0 | 1 | 1 | 1 | 0 |
| 0 | 0 | 0 | 0 | 1 | 1 | 0 | 0 | 12 | 0 | 0 | 0 | 0 | 1 | 0 | 1 | 0 |
| 0 | 0 | 0 | 0 | 1 | 1 | 0 | 1 | 13 | 0 | 0 | 0 | 0 | 1 | 0 | 1 | 1 |
| 0 | 0 | 0 | 0 | 1 | 1 | 1 | 0 | 14 | 0 | 0 | 0 | 0 | 1 | 0 | 0 | 1 |
| 0 | 0 | 0 | 0 | 1 | 1 | 1 | 1 | 15 | 0 | 0 | 0 | 0 | 1 | 0 | 0 | 0 |
| ⋮ | | | | | | | | ⋮ | ⋮ | | | | | | | |
| 0 | 1 | 1 | 0 | 0 | 0 | 0 | 1 | 97 | 0 | 1 | 0 | 1 | 0 | 0 | 0 | 1 |
| 0 | 1 | 1 | 0 | 0 | 0 | 1 | 0 | 98 | 0 | 1 | 0 | 1 | 0 | 0 | 1 | 1 |
| 0 | 1 | 1 | 0 | 0 | 0 | 1 | 1 | 99 | 0 | 1 | 0 | 1 | 0 | 0 | 1 | 0 |
| 0 | 1 | 1 | 0 | 0 | 1 | 0 | 0 | 100 | 0 | 1 | 0 | 1 | 0 | 1 | 1 | 0 |
| 0 | 1 | 1 | 0 | 0 | 1 | 0 | 1 | 101 | 0 | 1 | 0 | 1 | 0 | 1 | 1 | 1 |
| 0 | 1 | 1 | 0 | 0 | 1 | 1 | 0 | 102 | 0 | 1 | 0 | 1 | 0 | 1 | 0 | 1 |
| 0 | 1 | 1 | 0 | 0 | 1 | 1 | 1 | 103 | 0 | 1 | 0 | 1 | 0 | 1 | 0 | 0 |
| 0 | 1 | 1 | 0 | 1 | 0 | 0 | 0 | 104 | 0 | 1 | 0 | 1 | 1 | 1 | 0 | 0 |
| 0 | 1 | 1 | 0 | 1 | 0 | 0 | 1 | 105 | 0 | 1 | 0 | 1 | 1 | 1 | 0 | 1 |
| 0 | 1 | 1 | 0 | 1 | 0 | 1 | 0 | 106 | 0 | 1 | 0 | 1 | 1 | 1 | 1 | 1 |
| 0 | 1 | 1 | 0 | 1 | 0 | 1 | 1 | 107 | 0 | 1 | 0 | 1 | 1 | 1 | 1 | 0 |
| 0 | 1 | 1 | 0 | 1 | 1 | 0 | 0 | 108 | 0 | 1 | 0 | 1 | 1 | 0 | 1 | 0 |
| 0 | 1 | 1 | 0 | 1 | 1 | 0 | 1 | 109 | 0 | 1 | 0 | 1 | 1 | 0 | 1 | 1 |
| 0 | 1 | 1 | 0 | 1 | 1 | 1 | 0 | 110 | 0 | 1 | 0 | 1 | 1 | 0 | 0 | 1 |
| 0 | 1 | 1 | 0 | 1 | 1 | 1 | 1 | 111 | 0 | 1 | 0 | 1 | 1 | 0 | 0 | 0 |
| 0 | 1 | 1 | 1 | 0 | 0 | 0 | 0 | 112 | 0 | 1 | 0 | 0 | 1 | 0 | 0 | 0 |
| 0 | 1 | 1 | 1 | 0 | 0 | 0 | 1 | 113 | 0 | 1 | 0 | 0 | 1 | 0 | 0 | 1 |
| 0 | 1 | 1 | 1 | 0 | 0 | 1 | 0 | 114 | 0 | 1 | 0 | 0 | 1 | 0 | 1 | 1 |
| 0 | 1 | 1 | 1 | 0 | 0 | 1 | 1 | 115 | 0 | 1 | 0 | 0 | 1 | 0 | 1 | 0 |
| ⋮ | | | | | | | | ⋮ | ⋮ | | | | | | | |
| 1 | 1 | 0 | 0 | 0 | 1 | 1 | 0 | 198 | 1 | 0 | 1 | 0 | 0 | 1 | 0 | 1 |
| 1 | 1 | 0 | 0 | 0 | 1 | 1 | 1 | 199 | 1 | 0 | 1 | 0 | 0 | 1 | 0 | 0 |
| 1 | 1 | 0 | 0 | 1 | 0 | 0 | 0 | 200 | 1 | 0 | 1 | 0 | 1 | 1 | 0 | 0 |
| 1 | 1 | 0 | 0 | 1 | 0 | 0 | 1 | 201 | 1 | 0 | 1 | 0 | 1 | 1 | 0 | 1 |
| 1 | 1 | 0 | 0 | 1 | 0 | 1 | 0 | 202 | 1 | 0 | 1 | 0 | 1 | 1 | 1 | 1 |
| 1 | 1 | 0 | 0 | 1 | 0 | 1 | 1 | 203 | 1 | 0 | 1 | 0 | 1 | 1 | 1 | 0 |
| 1 | 1 | 0 | 0 | 1 | 1 | 0 | 0 | 204 | 1 | 0 | 1 | 0 | 1 | 0 | 1 | 0 |
| 1 | 1 | 0 | 0 | 1 | 1 | 0 | 1 | 205 | 1 | 0 | 1 | 0 | 1 | 0 | 1 | 1 |
| 1 | 1 | 0 | 0 | 1 | 1 | 1 | 0 | 206 | 1 | 0 | 1 | 0 | 1 | 0 | 0 | 1 |
| 1 | 1 | 0 | 0 | 1 | 1 | 1 | 1 | 207 | 1 | 0 | 1 | 0 | 1 | 0 | 0 | 0 |
| 1 | 1 | 0 | 1 | 0 | 0 | 0 | 0 | 208 | 1 | 0 | 1 | 1 | 1 | 0 | 0 | 0 |
| 1 | 1 | 0 | 1 | 0 | 0 | 0 | 1 | 209 | 1 | 0 | 1 | 1 | 1 | 0 | 0 | 1 |
| 1 | 1 | 0 | 1 | 0 | 0 | 1 | 0 | 210 | 1 | 0 | 1 | 1 | 1 | 0 | 1 | 1 |
| 1 | 1 | 0 | 1 | 0 | 0 | 1 | 1 | 211 | 1 | 0 | 1 | 1 | 1 | 0 | 1 | 0 |
| 1 | 1 | 0 | 1 | 0 | 1 | 0 | 0 | 212 | 1 | 0 | 1 | 1 | 1 | 1 | 1 | 0 |
| 1 | 1 | 0 | 1 | 0 | 1 | 0 | 1 | 213 | 1 | 0 | 1 | 1 | 1 | 1 | 1 | 1 |
| 1 | 1 | 0 | 1 | 0 | 1 | 1 | 0 | 214 | 1 | 0 | 1 | 1 | 1 | 1 | 0 | 1 |
| ⋮ | | | | | | | | ⋮ | ⋮ | | | | | | | |
| 1 | 1 | 1 | 1 | 1 | 1 | 0 | 0 | 252 | 1 | 0 | 0 | 0 | 0 | 0 | 1 | 0 |
| 1 | 1 | 1 | 1 | 1 | 1 | 0 | 1 | 253 | 1 | 0 | 0 | 0 | 0 | 0 | 1 | 1 |
| 1 | 1 | 1 | 1 | 1 | 1 | 1 | 0 | 254 | 1 | 0 | 0 | 0 | 0 | 0 | 0 | 1 |
| 1 | 1 | 1 | 1 | 1 | 1 | 1 | 1 | 255 | 1 | 0 | 0 | 0 | 0 | 0 | 0 | 0 |

F I G. 1 2
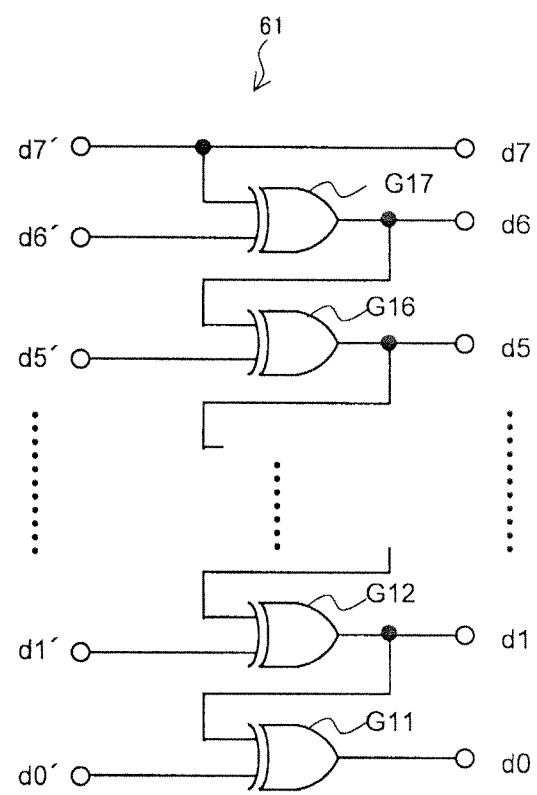

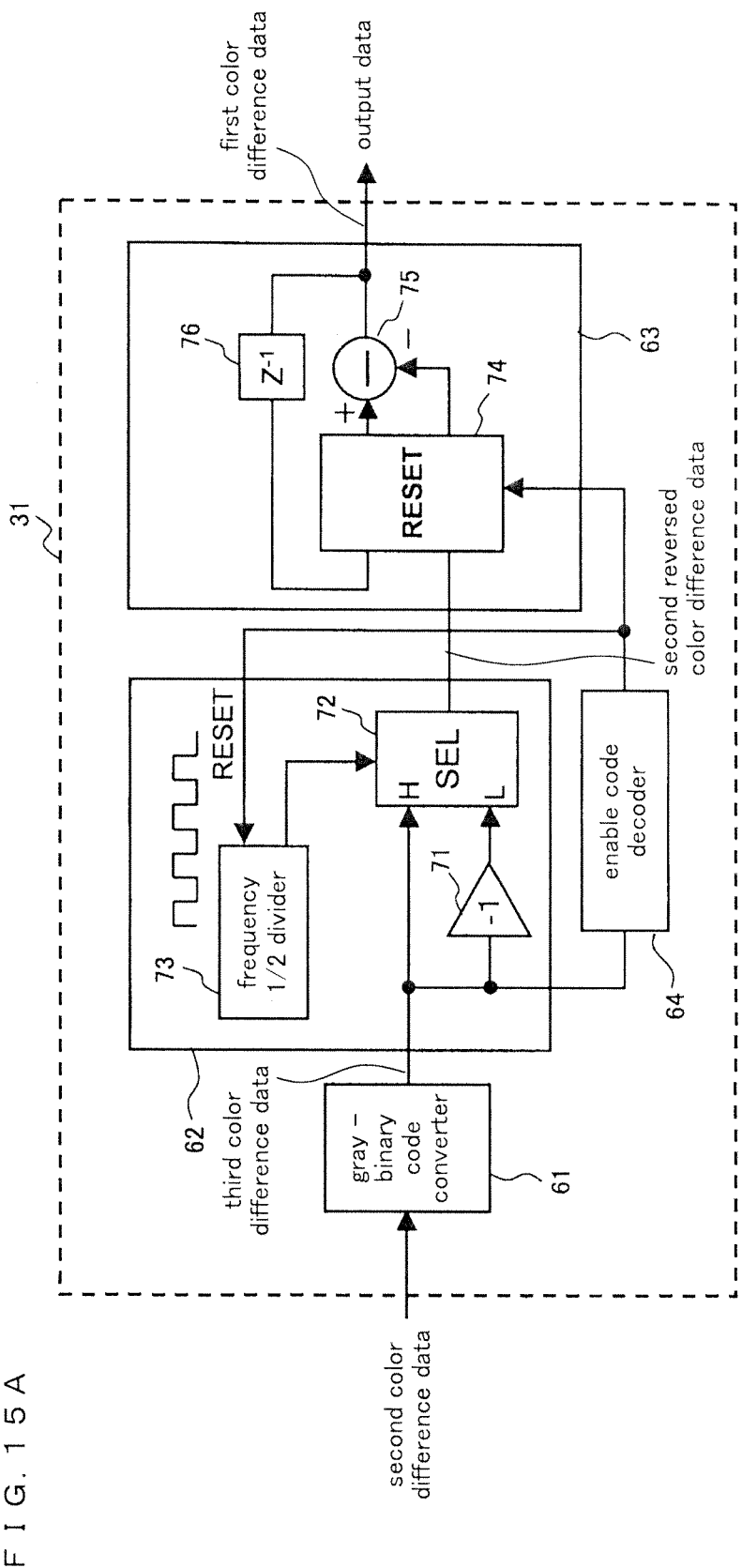
F I G. 15 A
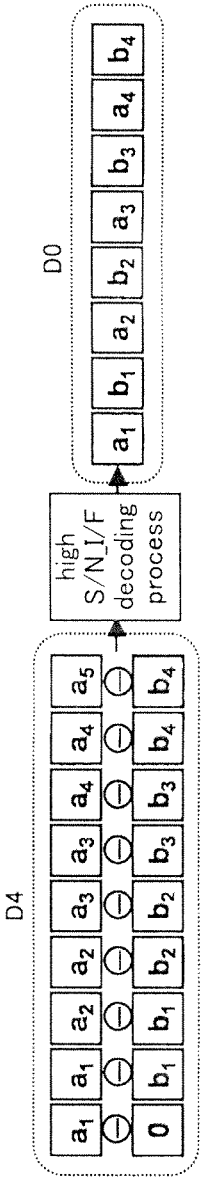
F I G. 15 B

F I G. 1 6
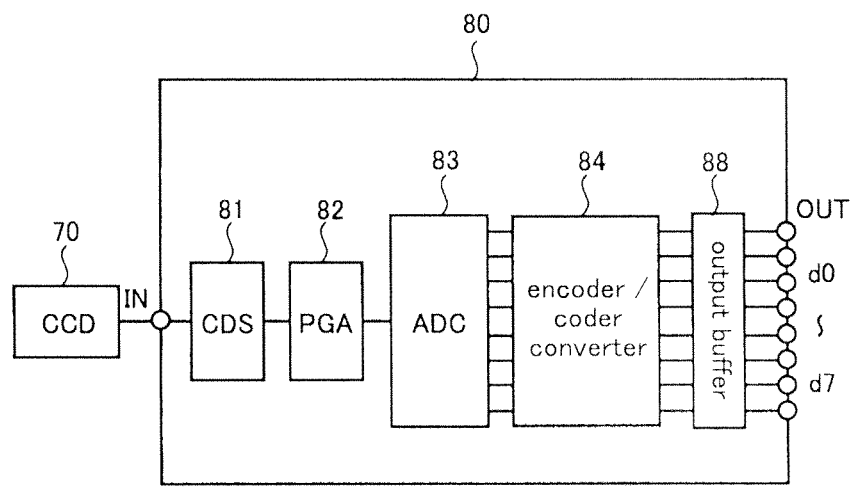
F I G. 1 7
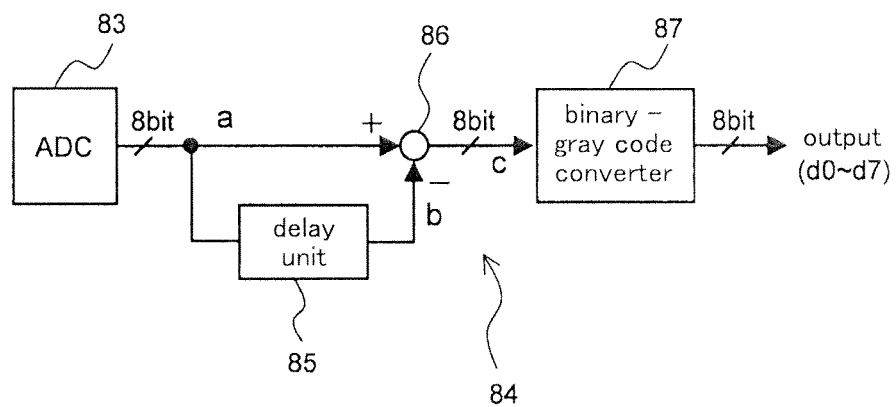

FIG. 19

| colors | | (A) | (B) | (C) | (D) | (E) | (F) | (G) | (H) |
|---|---|---|---|---|---|---|---|---|---|
| | | R | G | R | G | R | G | R | G |
| base 10 | | 200 | 100 | 207 | 100 | 212 | 101 | 209 | 100 |
| output code before the prior art | binary code | 11001000 | 01100100 | 11001111 | 01100100 | 11010100 | 01100101 | 11010001 | 01100100 |
| | number of changing bits in switching between codes | — | 4 | 5 | 5 | 3 | 3 | 1 | 4 |
| output code of the prior art | differential base 10 | 200 (initial data) | 100 (initial data) | 7 (differential) | 0 (differential) | 5 (differential) | 1 (differential) | 253(-3) (differential) | 255(-1) (differential) |
| | binary code | 11001000 | 01100100 | 00000111 | 00000000 | 00000101 | 00000001 | 11111101 | 11111111 |
| | gray code | 01011000 | 10101110 | 00000100 | 00000000 | 00000111 | 00000001 | 10000001 | 10000000 |
| | number of changing bits in switching between codes | — | 4 | 3 | 1 | 3 | 2 | 2 | 2 |

ΔR3-1 ΔG4-2 ΔR5-3 ΔG6-4 ΔR7-5 ΔG8-6

SEMICONDUCTOR INTEGRATED CIRCUIT, IMAGING SYSTEM, AND SIGNAL CONVERSION METHOD

This Application is a continuation of International Application No. PCT/JP2009/000352, whose international filing date is Jan. 30, 2009, the disclosures of which Application is incorporated by reference herein. The benefit of the filing and priority date of the International Application is respectfully requested.

FIELD OF THE INVENTION

The present invention relates to a technology developed for reduction of a noise energy generated when digital image data is transmitted by using a code conversion method in an imaging system equipped with an imaging device such as an image sensor, more particularly to a semiconductor integrated circuit, an imaging system, and a signal conversion method thus technically characterized. The present invention provides a distinctive technology which contributes to the noise energy reduction in a digital interface of an internal LSI in, for example, digital cameras and video cameras.

BACKGROUND OF THE INVENTION

In recent years, the camera industry has been experiencing the rapidly ongoing technology transition from analog to digital devices. The market of digital still cameras which require no film development, in particular, is roaring and attracting consumers. Most of mobile telephones selling now are camera-equipped telephones, and pixels and image processes increasingly upgraded in digital still cameras are contributing to remarkable improvements of an image quality.

The digital camera is conventionally embedded with an analog front-end device (large-scale semiconductor integrated circuit). The analog front-end device converts an image signal (analog electric charge signal) outputted from a solid image sensor into digital data adapted to the analog electric charge signal and outputs the digital data.

The digital data outputted from the analog front-end device is subjected to a variety of image processing tasks, for example, luminance signal processing, color separation processing, and color matrix processing, executed by a signal processing circuit such as DSP (digital signal processor). The solid image sensor, DSP, and analog front-end device are configured of semiconductor integrated circuits, and the semiconductor integrated circuits are mounted on a printed wiring board.

Referring to FIG. 21, conventional problems of the imaging system (such as electronic still camera or video camera) are described. The imaging system has a CCD (charge coupled device) 91 used as an imaging device, an AD conversion LSI 92, and a DSP 93. The CCD 91, AD conversion LSI 92, and DSP 93 are configured of semiconductor integrated circuits, and semiconductor integrated circuits are mounted on a printed wiring board 100. The CCD 91 outputs an analog image signal obtained when the CCD 91 captures an image and outputs the obtained analog image signal to the AD conversion LSI 92. The AD conversion LSI 92 converts the analog image signal inputted thereto into a digital signal, and outputs the digital signal to the DSP 93. The DSP 93 image-processes the digital signal inputted thereto and displays the image-processed digital signal on a display 101.

The AD conversion LSI 92 is connected to the DSP 93 on the printed wiring board 100 with printed wiring routed thereon. When the image data generated by the AD conversion LSI 92 is transmitted to the DSP 93 by way of the printed wiring, a power supply noise occurs. The power supply noise penetrates into the CCD 91 through power supply lines (Vcc and ground) on the printed wiring board 100. Then, the power supply noise infiltrates the analog image signal outputted from the CCD 91 and inputted to the AD conversion LSI 92. The power supply noise thus introduced into the AD conversion LSI 92 is transmitted outside through an output terminal of the LSI 92 and then reenters the LSI 92 through an input terminal thereof by way of the power supply lines and a semiconductor substrate.

Because of the factors described below, the power supply noise results in a relatively large value.

When the digital signal is outputted from the AD conversion LSI 92, there is a large through current or load drive current at the time of bit change.

An LSI output unit conventionally generates a relatively large output current.

Because the AD conversion LSI 92 is provided with an amplifier such as PGA (programmable gain control amplifier) which amplifies an inputted analog signal, the power supply noise is unavoidably amplified by the amplifier alongside the image signal. The noise thus amplified appears on a display screen, deteriorating the quality of a displayed image.

Though a possible solution for the noise is to connect a pass capacitor having a large capacity to the power supply terminal of the AD conversion LSI, it is not a decisive solution for any noise-associated problems. On top of that, there are unfavorable events brought by the solution; a chip size increase and deterioration of a packaging efficiency.

An AD conversion LSI 80 illustrated in FIG. 16 is a device disclosed in Unexamined Japanese Patent Publication No. 2002-300591, which was developed to solve the technical disadvantage described so far.

The AD conversion LSI 80 has a CDS (correlated double sampling circuit) 81, a PGA 82, an AD converter (ADC) 83, an encoder/code converter 84, and an output buffer 88. The CDS 81 performs a sampling process to an analog image signal transmitted from a CCD 70. The PGA 82 variably controls an amplification gain relative to the sampling signal. The ADC 83 converts the amplified analog signal into a digital signal. The encoder/code converter 84 differentiates the AD-converted digital image data and converts the resulting digital image data into gray code. The output buffer 83 outputs the code-converted signals outside of a chip.

The AD conversion LSI 80 is provided with the encoder/code converter 84 between the AD converter 83 and the output buffer 88, which is materially different to the illustration of FIG. 21. The gray code is a binary numeral representation of integral numbers, where there is always only one bit changing position in the binary numeral representation when an original integral number changes by 1.

The encoder/code converter 84 calculates a differential between codes of adjacent pixels involved with the same color after the AD conversion, and converts the differentiated output code into a code with less number of changing bits in switching between the codes such as gray code. Such a code conversion reduces a through current and a load drive current in an output unit, thereby reducing any noise energy associated with output variation.

A typical code converting means used as the encoder/code converter 84 is a binary-gray code converter which converts the inputted binary code into the gray code. The prior art described so far places an emphasis on the technical characteristic that "the differentiated output code targeted for the reduction of changing bits represents the differential between codes of adjacent pixels involved with the same color after the AD conversion", more specifically, "pixels involved with the same color".

According to the Bayer array, R (red) and G (green) pixels are arranged on a line in the sequence of R, G, R, G, R, G, . . . , and B (blue) and G (green) pixels are arranged on another line in the sequence of G, B, G, B, G, B, . . . .

The "differential between codes of adjacent pixels involved with the same color" in the former sequence is:

$\Delta R_{3-1}$=(R data value in third row)−(R data value in first row);
$\Delta R_{5-3}$=(R data value in fifth row)−(R data value in third row); and
$\Delta R_{7-5}$=(R data value in seventh row)−(R data value in fifth row).

The "differential between codes of adjacent pixels involved with the same color" in the latter sequence is:

$\Delta G_{4-2}$=(G data value in fourth row)−(G data value in second row);
$\Delta G_{6-4}$=(G data value in sixth row)−(G data value in fourth row); and
$\Delta G_{8-6}$=(G data value in eighth row)−(G data value in sixth row).

These formulas are used to extract changes in the gradation of the same color along a horizontal direction as differential information. A conventional AD-converted signal represents data where two different color data are each repetitive at every other pixel. Therefore, a differential between data of the same color at alternate pixels is obtained in the system described earlier.

FIG. 17 illustrates a structure of the encoder/code converter 84. The encoder/code converter 84 has a delay unit 85, a subtraction unit (differentiator) 86, and a binary-gray code converter 87. The delay unit 85 delays the data outputted from the AD converter 83 by a given clock cycle. The subtraction unit (differentiator) 86 calculates a differential between the data outputted from the AD converter 83 and the data delayed by the delay unit 85. The binary-gray code conversion device 87 converts binary data obtained by calculating the differential into the gray code.

FIG. 18 illustrates specific steps of the differential calculation and the binary data—gray code conversion. An amount of the delay by the delay unit 85 is equal to two cycles of a sampling clock of the CDS 81. The set delay amount is thus equal to two cycles to obtain the data differential of the same color at every other pixel.

An example is given below, in which R and G signals are inputted to the encoder/code converter 84 in turns as illustrated in A) of FIG. 18, and the AD conversion value of each signal changes (base 10) as illustrated in B). C) of the drawing shows the binary codes actually outputted. According to the prior art, these codes were directly outputted. D) of the drawing illustrates number of changing bits when each code switches to a next code as a result of comparison of the adjacent pixels. The number of changing bits in the switching of codes is calculated by the following formulas:

$\Delta GR_{2-1}$=(G data value in second row)−(R data value in first row);
$\Delta RG_{3-2}$=(R data value in third row)−(G data value in second row);
$\Delta GR_{4-3}$=(G data value in fourth row)−(R data value in third row);
$\Delta RG_{5-4}$=(R data value in fifth row)−(G data value in fourth row);

The subtraction unit 86 receives the binary codes of C) inputted from the AD converter 83. The subtraction unit 86 calculates a differential between the data values of the same color in adjacent pixels, that is, a differential between alternate data values as illustrated with curbed arrows in B). Similarly to the description given earlier, the differential is calculated by the following calculation formulas.

$\Delta R_{3-1}$=(R data value in third row)−(R data value in first row);
$\Delta G_{4-2}$=(R data value in fourth row)−(G data value in second row); and
$\Delta R_{5-3}$=(R data value in fifth row)−(R data value in third row).
$\Delta G_{6-4}$=(G data value in sixth row)−(G data value in fourth row).

An initial data is directly used without differential calculation. The value outputted from the subtraction unit 86 results in values of E) when expressed in base 10, and values of F) when expressed in binary code.

The binary-gray code converter 87 converts the differential binary codes in F) into the gray codes as illustrated in G). A downward bold arrow represents the binary-gray code conversion.

G) illustrates the number of changing bits in the switching of codes when adjacent pixels are compared to each other. Comparing D) and H), a smaller number of bits change in the switching of codes in the AD conversion LSI 80 than in the AD conversion LSI 92. The number of changing bits in the switching of codes in total (4, 4, 4, 5, 6, 5, 4) is "32" in the AD conversion LSI 92, while the number of changing bits in the switching of codes in total (4, 4, 0, 2, 1, 1, 1) is "13" in the AD conversion LSI 80. Thus, a tangible improvement in the AD conversion LSI 80 is confirmed.

Because the AD conversion LSI 80 calculates the differential of the same color and converts it into the gray code, there is no large variability between the differentials thereby calculated in adjacent pixels of different colors. Therefore, the number of changing bits when, for example, the output of R (red) image data is switched to the output of G (green) image data is relatively small.

The significance of the binary-gray code conversion is described below. If the differential is calculated but is not subjected to the binary-gray code conversion, the following problem remains unsolved. In a screen, there are plus and minus differentials by a substantially equal ratio. The binary code is expressed by the complement of 2. When the binary code changes from positive to negative, "0" unexceptionally changes to "1". When the binary code changes from negative to positive, "1" unexceptionally changes to "0". Once the binary code is converted into the gray code, the code variation is lessened when the binary code changes from positive to negative or vice versa.

For reference, a description is given to a relationship between the gray code and the binary code expressed by the complement of 2. In three-bit binary code, "000" changes to "111" when "0" changes to "−1" in base 10. In any other binary codes of four bits, eight bits, or larger bits, "0" similarly changes to "1", in which case all of the bits (three bits) change. On the other hand, when "0" changes to "−1" in base 10 in three-bit gray code, "000" changes to "100", in which case the changing bit is only one bit. Therefore, a through current flow generated at the time of output change in the output buffer is significantly reduced by outputting the gray code as compared to the binary code.

There is no abrupt change between adjacent pixels in any image signals, therefore, there is only a small number of changing bits between pixels of the same color when the code is converted into the gray code immediately after the AD conversion. The prior art does not immediately perform the gray code conversion but calculates the differential beforehand because of a relatively large code difference between different colors of a pixel in any image signals when the CCD output is transmitted through a color element array filter in contrast to a small change between adjacent pixels. An exception is gray color having little color variation in a subject to be imaged, in which there is only a small code difference between different colors. FIG. 20 illustrates a configuration of a conventional gray binary differential decoder 90 used on the reception side. The conventional gray binary differential decoder 90 has a gray binary code converter 91, an adder 92, and a delay unit 93.

Patent Document 1: Unexamined Japanese Patent Publication No. 2002-300591

SUMMARY OF THE INVENTION

Problem to be Solved by the Invention

The basic technical concept of the prior art (AD conversion LSI 80) is that there is a correlation between changes of data differential values in two colors outputted from an imaging device under normal imaging conditions, therefore, there is only a small change between the differential values. Describing this referring to the example given earlier, the change between $\Delta R_{3-1}$ and $\Delta G_{4-2}$, the change between $\Delta G_{4-2}$ and $\Delta R_{5-3}$, and the change between $\Delta R_{5-3}$ and $\Delta G_{6-4}$ are relatively small.

This, however, is inapplicable when a scene of nature monochromatic but having gradation change is imaged, in which case the differential values of two colors are largely different to each other. Describing this referring to the example given earlier, the change between $\Delta R_{3-1}$ and $\Delta G_{4-2}$, the change between $\Delta G_{4-2}$ and $\Delta R_{5-3}$, and the change between $\Delta R_{5-3}$ and $\Delta G_{6-4}$ are increased.

The sampling of the same color is performed at every other pixel. Because of that, the differential values adjacent to each other in D) produces a significantly large change therebetween in the case where gradation components having frequency characteristics close to the Nyquist frequency equal to ½ of a sampling frequency are included.

In the case of such a large change between the differential values as described so far, even the gray code conversion fails to reduce the number of changing bits in the switching of codes. As a result, a noise reduction effect is deteriorated (see FIG. 19).

In the illustration of FIG. 18, a data row in B) is (200, 100, 200, 100, 202, 101, 200, 100, . . . ), while a data row in B) in the illustration of FIG. 19 is (200, 100, 207, 100, 212, 101, 209, 100, . . . ). Thus, the R signals change significantly.

The number of changing bits in the switching of codes in the illustration of FIG. 18 is "13" in total (4, 4, 0, 2, 1, 1, 1), while the number of changing bits in the switching of codes in the illustration of FIG. 19 is "17" in total (4, 3, 1, 3, 2, 2, 2). Thus, the number of changing bits in the switching of codes is increased.

The present invention was accomplished to solve the conventional technical problems described so far. The present invention provides a semiconductor integrated circuit, an imaging system, and a signal conversion method capable of decreasing number of changing bits in the switching of codes when, for example, an image monochromatic but having gradation change is imaged to thereby reduce any noise generated when digital image data is outputted so that an image quality is improved.

Means for Solving the Problem

A semiconductor integrated circuit according to the present invention comprises:

an amplifier configured to amplify an analog color image signal inputted from an imaging device; an AD converter configured to convert the analog color image signal amplified by the amplifier into a digital signal;

an adjacent color difference data generator configured to calculate a differential between adjacent data in a data row having different color information per pixel of the digital signal to thereby generate a first color difference data having a first code format; and a code converter configured to convert the first color difference data into a second color difference data having a second code format, wherein the second code format is a code format where only a small number of bits change before and after the code conversion from the first code format.

The semiconductor integrated circuit is configurable as an analog front-end device on a chip. An example of the code converter is a binary-gray code converter.

The technical advantage of the present invention as compared to the prior art is the adjacent color difference data generator. The conventional differentiator was provided to calculate a differential between codes of adjacent pixels involved with the same color, whereas the adjacent color difference data generator according to the present invention calculates a differential between adjacent pixels in a data row having different color information per pixel after the AD conversion. The two devices are technically different in that "adjacent pixels involved with the same color" are targeted in one of them and "adjacent pixels in a data row having different color information" are targeted in the other. The "data row having different color information per pixel" can be obtained as far as an imaging element provided is provided with a multiple color filter which photoelectrically converts the optical image of a subject to be imaged. To help the invention be well understood, a description is given below referring to the Bayer array. The pixels to be differentiated according to the prior art are alternately adjacent pixels, whereas the pixels to be differentiated according to the present invention are pixels immediately next to each other. In the case of R1, G1, R2, G2, R3, G3, . . . , the pixels to be differentiated are R1–R2, R2–R3, . . . , and G1–G2, G2–G3, . . . . In the present invention, the pixels to be differentiated are R1–G1, G1–R2, R2–G2, G2–R3, R3–G3, . . . . Ri–Rj and Gi–Gj according to the prior art are two different color difference data. According to the present invention, Ri–Gj and Gi–Rj are just one color difference data. The description given so far is just an example, and does not necessarily impose any restriction on the present invention.

Then, the color difference data generated by taking the differential between the adjacent data having different color information is subjected to the code conversion by the code converter to be converted into the code format with less number of changing bits before and after the code conversion. When an image monochromatic but having gradation change, for example, is imaged, the number of changing bits before and after the code conversion is reduced as compared to the prior art. This consequently reduces a through current and an output load drive current generated in an output unit of the semiconductor integrated circuit having the AD converter. As a result, noise reduction can be more efficiently achieved when digital image data (digital signal) is outputted, which improves an image quality. Another advantage of the present invention is reduction of power consumption because of less gross volume of noise energy.

According to a preferred mode of the semiconductor integrated circuit of the present invention, the adjacent color difference data is a data uniformly including positive/negative codes, and the adjacent color difference data generator comprises: a color difference type differentiator configured to calculate the differential between the adjacent data in the data row having different color information per pixel of the digital signal to thereby generate a first reversed color difference data having the first code format and alternately including positive/negative codes per pixel clock; and a positive/negative code reverser configured to reverse the positive/negative codes of the first reversed color difference data per data to thereby generate the first color difference data.

This preferred mode more specifically describes the structural characteristic of the adjacent color difference data generator, wherein the adjacent color difference data generator comprises the color difference type differentiator and the positive/negative code reverser. The "color difference type" is closely related to the technical feature of the present invention, "the differential between the adjacent data in the data row having different color information per pixel of the digital signal". The positive/negative codes are more directly plus "+" and minus "−" codes.

The color difference type differentiator calculates the differential between the adjacent data in the data row having different color information per pixel of the digital signal supplied from the AD converter so that the first reversed color difference data alternately including the positive/negative codes per pixel clock. That "the first reversed color difference data alternately includes the positive/negative codes per pixel clock" is typically results from the structure of the color difference type differentiator described later, comprising a delay unit and a subtraction unit. It is difficult to convert the code format of the first reversed color difference data alternately including the positive/negative codes per pixel clock directly into the code format with less number of changing bits before and after the code conversion. To solve the difficulty, the positive/negative code reverser reverses the positive/negative codes of the first reversed color difference data per data to thereby generate the first color difference data uniformly including positive/negative codes. Then, the first color difference data becomes just one uninterrupted color difference data. The code format (first code format) of the first color difference data thus uniformly including the positive/negative codes can be smoothly converted into the code format with less number of changing bits before and after the code conversion. The successful code conversion can reduce the number of bits changing simultaneously when the digital signal is switched (number of simultaneously changing bits), thereby reducing the through current and the load drive current of the output unit. As a result, any noise associated with the output variation can be reduced.

According to another preferred mode of the semiconductor integrated circuit of the present invention, the color difference type differentiator comprises: a first delay unit configured to delay the digital signal by a delay amount equal to a pixel clock; and a first subtraction unit configured to calculate a differential between the digital signal and the delayed digital signal obtained by the first delay unit.

The subtraction unit calculates the difference between the delayed data and the original data, and the first delay unit delays the digital signal by the delay amount equal to a pixel clock. Therefore, the color difference data representing the difference between the adjacent data having different color information can be generated. Because the delay amount is equal to a pixel clock, the color difference data thereby obtained alternately includes the positive/negative codes per pixel clock. The problem of alternately different codes is solved by a positive/negative code reverser described later.

According to still another preferred mode of the semiconductor integrated circuit of the present invention, the positive/negative code reverser reverses the positive/negative codes of the first reversed color difference data per data based on a frequency ½ control of a pixel clock phase-fixed with reference to an arbitrary phase position temporally forward in a horizontal direction of effective data in the digital signal to thereby generate the first color difference data.

According to still another preferred mode of the semiconductor integrated circuit of the present invention, the positive/negative code reverser reverses the positive/negative codes of the first reversed color difference data per data based on a frequency ½ control of a pixel clock phase-fixed with reference to an arbitrary phase position temporally forward in a vertical direction of the effective data in the digital signal to thereby generate the first color difference data.

Whether the reference phase of the pixel clock is fixed forward in the horizontal direction of the effective data or forward in the vertical direction thereof, the positive/negative code reverser converts the first reversed color difference data outputted from the first subtraction unit where the positive/negative codes are reversed per data into the first color difference data uniformly including the positive/negative codes. Transmitting the first reversed color difference data directly to the code converter to subject it to the code conversion, it is difficult to convert the data into the second color difference data having the second code format with less number of changing bits before and after the code conversion. Once the first reversed color difference data is converted into the first color difference data uniformly including the positive/negative codes, such a difficulty can be avoided, and the code converter can correctly convert the first color difference data into the second color difference data having the second code format with less number of changing bits before and after the code conversion.

According to still another preferred mode of the semiconductor integrated circuit of the present invention, the adjacent color difference data generator comprises a 0 data inserter, wherein the 0 data inserter is provided before the color difference type differentiator to insert 0 data in a leading data section of the effective data in the digital signal.

In the structure where the color difference type differentiator has the first delay unit and the first subtraction unit, leading data of the effective data is lost. The 0 data inserter avoids the loss of the leading data so that all of the effective data can be handled as expected. This prevents any accidental increase of the noise energy.

According to still another preferred mode of the semiconductor integrated circuit of the present invention, the first code format is binary code format, and the second code format is gray code format.

Summarizing the technical characteristics of the semiconductor integrated circuit according to the present invention described so far, the differentials between the color difference data adjacent to each other are no longer very different to one another, and the number of simultaneously changing bits can be reduced when the output of the image data having smooth gradation is switched. Therefore, any noise when the digital image data is outputted can be efficiently reduced, which improves an image quality. Another advantage of the present invention is reduction of power consumption because of less gross volume of noise.

The semiconductor integrated circuit according to the present invention was described so far. Next, an imaging system according to the present invention is described.

An imaging system according to the present invention comprises a color difference data decoder, the color difference data decoder including: a code inverse converter, a positive/negative code reversal restorer, and a subtraction accumulator, wherein the code inverse converter is configured to decode the second color difference data outputted from a first semiconductor integrated circuit into a third color difference data having the first code format and uniformly including positive/negative codes, the positive/negative code reversal restorer is configured to reverse the positive/negative codes of the third color difference data outputted from the code inverse converter per data to thereby generate a second reversed color difference data where the positive/negative codes are reversed per data, and the subtraction accumulator is configured to accumulate the second reversed color difference data while calculating a differential between adjacent data thereof to thereby decode the second reversed color difference data into the first color difference data.

The code inverse converter decodes the second color difference data (having the second code format with less number of simultaneously changing bits) outputted from the first semiconductor integrated circuit into the third color difference data having the first code format and uniformly including the positive/negative codes. The third color difference data thus uniformly includes the positive/negative codes. When the third color difference data obtained from the decoding process is directly subjected to the subtraction and then accumulated, the resulting data row and the data row of the digital signal outputted from the AD converter in the first semiconductor integrated circuit both have the positive and negative reversed per data. Thus, the code inverse converter alone cannot correctly process the second color difference data back into the first color difference data. Therefore, the third color difference data is supplied to the positive/negative code reversal restorer before the third color difference data is processed by the subtraction accumulator. The positive/negative code reversal restorer reverses the positive/negative codes of the third color difference data uniformly including the positive/negative codes supplied from the code inverse converter per data so to thereby obtain the second reversed color difference data where the positive/negative codes are reversed per data. The second reversed color difference data thus obtained is ready for the subtraction and accumulation. The second reversed color difference data is then outputted to the subtraction accumulator, so that the subtraction accumulator accumulates the second reversed color difference data where the positive/negative codes are reversed per data while calculating the differential between the adjacent data thereof. Then, the obtained data row (color difference data) is configured equally to the data row of the digital signal outputted from the AD converter in the first semiconductor integrated circuit. As a result, the first color difference data is correctly obtained again.

According to a preferred mode of the imaging system of the present invention, the positive/negative code reversal restorer reverses the positive/negative codes of the first color difference data outputted from the code inverse converter per data based on a frequency ½ control of a pixel clock phase-fixed with reference to an arbitrary phase position temporally forward in a horizontal direction of effective data in the digital signal to thereby generate the second reversed color difference data.

According to another preferred mode of the imaging system of the present invention, the positive/negative code reversal restorer reverses the positive/negative codes of the first color difference data outputted from the code inverse converter per data based on a frequency ½ control of a pixel clock phase-fixed with reference to an arbitrary phase position temporally forward in a vertical direction of the effective data in the digital signal to thereby generate the second reversed color difference data.

Whether the reference phase of the pixel clock is fixed forward in the horizontal direction of the effective data or forward in the vertical direction thereof, the positive/negative code reversal restorer can correctly reverse the positive/negative codes of the color difference data per data while observing a correct phase relationship.

According to still another preferred mode of the imaging system of the present invention, the subtraction accumulator comprises: a second subtraction unit configured to subtract the second reversed color difference data; and a second delay unit configured to delay a processing result obtained by the subtraction unit, wherein the second delay unit delays the processing result by a delay amount equal to a pixel clock when the color information of the second reversed color difference data changes per pixel, and supplies the delayed processing result as an input to be accumulated to the subtraction unit.

This mode can correctly process the second color difference data supplied from the first semiconductor integrated circuit into the original first color difference data.

According to still another preferred mode of the imaging system of the present invention, the subtraction accumulator comprises a resetter configured to insert initial 0 data in the second reversed color difference data.

This mode eliminates any impact from the 0 data inserted by the 0 data inserter, thereby correctly restoring the data row.

The imaging system according to still another preferred mode of the present invention preferably further comprises:

an enable code appender provided before the code converter and configured to append by an arbitrary timing an enable code indicating a reference timing to the first color difference data; and an enable code decoder provided behind the code inverse converter and configured to decode the enable code, wherein the color difference data decoder sets a reference timing for starting the decoding based on the enable code decoded by the enable code decoder.

Accordingly, functions of the imaging system according to the present invention can be started by any arbitrary timing.

According to still another preferred mode of the imaging system of the present invention, the first code format is binary code format, and the second code format is gray code format.

A signal conversion method according to the present invention comprises steps of:

converting an analog color image signal into a digital signal;

calculating a differential between adjacent data in a data row having different color information per pixel of the digital signal to thereby generate a reversed color difference data having a first code format and alternately including positive/negative codes per pixel clock;

reversing the codes of the reversed color difference data per data, starting from a reference position arbitrarily provided in the reversed color difference data to thereby generate a first color difference data uniformly including the positive/negative codes; and converting the first color difference data into a second color difference data having a second code format, wherein the second code format is a code format where only a small number of bits change before and after the code conversion from the first code format.

Effect of the Invention

The present invention reduces the number of changing bits before and after the code conversion as compared to the prior art in, for example, image data monochromatic but having gradation change, thereby lessening a through current and an output load drive current generated in an output unit of a semiconductor integrated circuit. As a result, noise reduction can be more effectively achieved when digital image data (digital signal) is outputted, which improves an image quality. Another advantage of the present invention is reduction of power consumption because of less gross volume of noise energy.

BRIEF DESCRIPTION OF THE DRAWINGS

FIG. 2 is a block diagram illustrating in detail a structure of a color difference type encoder/code converter according to the exemplary embodiment 1.

FIG. 3A is a block diagram illustrating in further detail the structure of the color difference type encoder/code converter according to the exemplary embodiment 1.

FIG. 3B is an operation diagram of according to the exemplary embodiment 1.

FIG. 6 is a circuit diagram illustrating in detail a structure of a binary-gray code converter according to the exemplary embodiment 1.

FIG. 9 is a table illustrating a correspondence relationship among base 10, binary code, and gray code.

FIG. 12 is a circuit diagram illustrating in detail a structure of a gray-binary code converter according to the exemplary embodiment.

FIG. 15A is a block diagram illustrating in detail a structure of a color difference data decoder according to the exemplary embodiment 2.

FIG. 15B is an operation diagram of the color difference data decoder according to the exemplary embodiment 2.

FIG. 16 is a block diagram illustrating a schematic structure of an AD conversion LSI used in a conventional imaging system.

FIG. 17 is a block diagram illustrating a structure of a conventional encoder/code converter.

FIG. 19 is a detailed operation diagram (2) of the conventional encoder/code converter.

DESCRIPTION OF REFERENCE SYMBOLS

| | |
|---|---|
| 10 | image sensor (imaging device) |
| 20 | analog front-end device (AD conversion LSI: first semiconductor integrated circuit) |
| 21 | correlated double sampling circuit (CDS) |
| 22 | amplifier (programmable gain amplifier) |
| 23 | AD converter (ADC) |
| 24 | color difference type encoder/code converter |
| 25 | parallel data output unit |
| 30 | digital signal processor (DSP: second semiconductor integrated circuit) |
| 31 | color difference data decoder |
| 32 | image processor |
| 41 | adjacent color difference data generator |
| 42 | code converter (binary - gray code converter) |
| 43 | one-shot trigger |
| 44 | enable code appender |
| 51 | 0 data inserter |
| 52 | color difference type differentiator |
| 53 | positive/negative code reverser |
| 54 | delay unit |
| 55 | subtraction unit |
| 56 | amplifier (gain coefficient − 1) |
| 57 | selector |
| 58 | frequency 1/2 divider |
| 61 | code inverse converter |
| 62 | positive/negative code reversal restorer |
| 63 | subtraction accumulator |
| 64 | enable code decoder |
| 71 | amplifier (gain coefficient − 1) |
| 72 | selector |
| 73 | frequency 1/2 divider |
| 74 | resetter |
| 75 | subtraction unit |
| 76 | delay unit |

Exemplary Embodiments for Carrying out the Invention

Hereinafter, exemplary embodiments of a semiconductor integrated circuit and an imaging system according to the present invention are described in detail referring to the accompanied drawings.

Exemplary Embodiment 1

Figure 1:
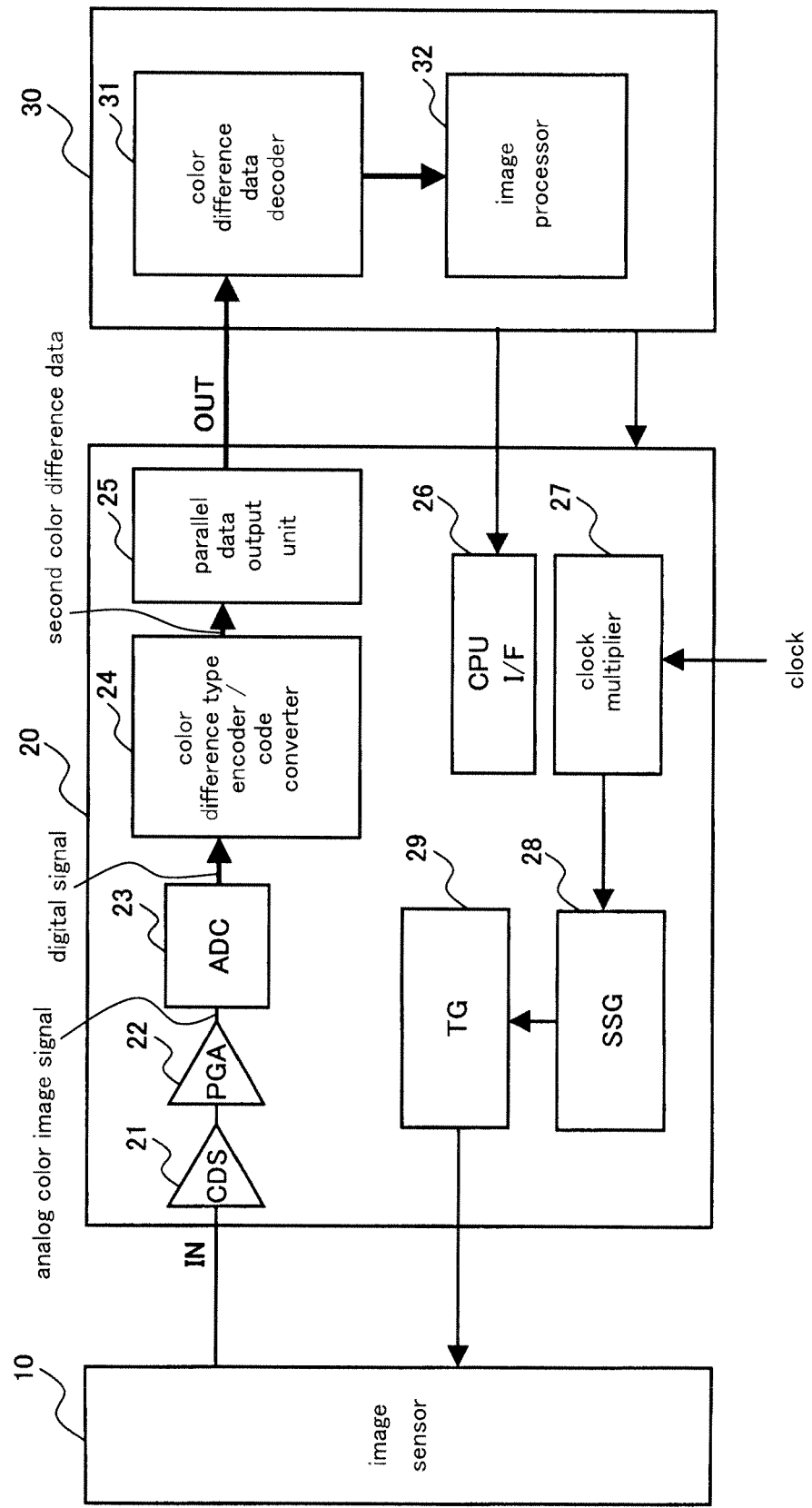
FIG. 1 is a block diagram illustrating a schematic structure of an imaging system according to an exemplary embodiment 1 of the present invention.

FIG. 1 is a block diagram illustrating a schematic structure of an imaging system according to an exemplary embodiment 1 of the present invention. The imaging system includes an image sensor, an analog front-end device, and a DSP.

The imaging system has an image sensor 10 used as an imaging device such as CCD, an analog front-end device (AD conversion LSI) 20 called a first semiconductor integrated circuit, and a DSP 30 called a second semiconductor integrated circuit.

The analog front-end device 20 has a correlated double sampling circuit (CDS) 21, an amplifier (programmable amplifier (PGA)) 22, an AD converter (ADC) 23, a color difference type encoder/code converter 24, a parallel data output unit 25, a CPU interface 26, a clock multiplier 27, a synchronous signal generator (SSG) 28, and a timing generator 29.

The CDS 21 performs a sampling process to an analog color image signal outputted from the image sensor 10 and inputted to an input terminal IN. The PGA 22 amplifies the sampled image signal in a gain controllable manner. The ADC 23 converts the amplified analog signal into a digital signal. The color difference type encoder/code converter 24 differentiates digital image data adjacent to each other in the digital signal to reverse positive/negative codes of the data per pixel so that a first color difference data having binary code format is generated, and further converts the code format of the first color difference data (binary code format) into gray code format so that a second color difference data is generated. The parallel data output unit 25 outputs signals converted into the gray code format (second color difference data) outside of a chip through an output terminal OUT.

The DSP 30 has a color difference data decoder 31 and an image processor 32. The color difference data decoder 31 converts the second color difference data having the gray code format into a third color difference data having the binary code format, and further reverses positive/negative codes of the third color difference data to decode the third color difference data into the first color difference data having the binary code format. The image processor 32 images-processes the first color difference data outputted from the color difference data decoder 31.

The circuits constituting all of the structural elements of the analog front-end device 20 but the color difference type encoder/code converter 24 may be comparably provided in a conventional imaging system. The present exemplary embodiment is technically advantageous in that the color difference type encoder/code converter 24 and the color difference data decoder 31 are inserted between the AD converter 23 and the parallel data output unit 25.

Though not illustrated in the drawings, the LSI chip includes therein, for example, a controller which controls an overall operation of the chip and gain-controls the programmable gain amplifier 22, and a clock generator which generates a clock signal which notifies a sampling timing to the CDS 21 and clock signals necessary for the operations of the AD converter 23 and the color difference type encoder/code converter 24 (or clock buffer which distributes a clock signal inputted from outside to the circuits in the chip). The circuit configuration of the analog front-end device 20 is not necessarily limited to the illustration of FIG. 1.

FIG. 2 is a block diagram illustrating in detail a structure of the color difference type encoder/code converter 24. Referring to FIG. 2, the code converter 24 has an adjacent color difference data generator 41 and a code converter 42. The adjacent color difference data generator 41 calculates a differential between adjacent data in a data row having different color information per pixel after the AD conversion by the AD converter 23 to thereby generate the first color difference data having the binary code format. The code converter 42 converts the first color difference data into the second color difference data having such a code format that a small number of bits change when the adjacent codes are switched (gray code format in the present exemplary embodiment).

The adjacent color difference data generator 41 has a 0 data inserter 51, a color difference type differentiator 52, and a positive/negative code reverser 53. The 0 data inserter 41 inserts 0 data in the digital signal outputted from the AD converter 23. The color difference type differentiator 52 calculates a differential between adjacent data in a data row having different color information per pixel to thereby generate a first reversed color difference data having the binary code format and alternately including positive/negative codes per pixel clock. The color difference type differentiator 52 has a first delay unit 54 and a first subtraction unit 55. The first delay unit 54 delays the digital signal outputted from the 0 data inserter 51 (0 data-inserted digital signal) by a delay amount equal to a clock cycle. The first subtraction unit 55 calculates a differential between the digital signal outputted from the 0 data inserter 51 and the delayed digital signal obtained by the first delay unit 54 to thereby generate the first reversed color difference data. The positive/negative code reverser 53 reverses the positive/negative codes of the first reversed color difference data per data to thereby generate a first color difference data having the binary code format and uniformly including the positive/negative codes. A binary-gray code converter is used as the code converter 42. The code converter 42 converts the first color difference data into the second color difference data having the gray code format.

FIG. 3A is a block diagram illustrating in further detail the structure of the color difference type encoder/code converter 24. The color difference type encoder/code converter 24 has an adjacent color difference data generator 41 and a binary-gray code converter (an example of the code converter) 42. The adjacent color difference data generator 41 has a 0 data inserter 51, a color difference type differentiator 52, and a positive/negative code reverser 53. The color difference type differentiator 52 has a first delay unit 54 and a first subtraction unit 55. The positive/negative code reverser 53 has an amplifier 56, a selector 57, and a frequency ½ divider 58. The gain coefficient of the amplifier 56 is set to −1. The frequency ½ divider 58 divides a pixel clock by two.

Figure 4A:
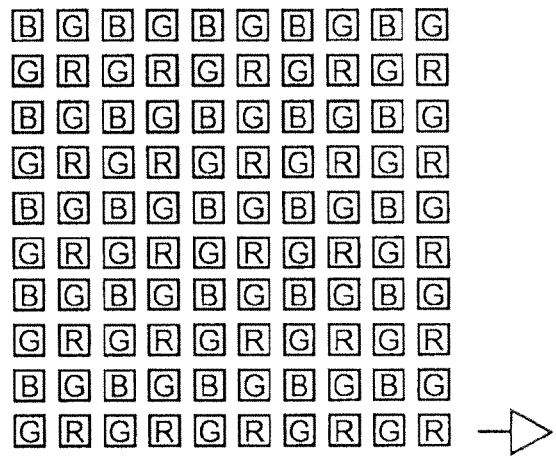
FIG. 4A is an illustration of Bayer array according to the exemplary embodiment 1.

FIG. 3B is an operation diagram of the color difference type encoder/code converter 24. A description given below to the operation of the color difference type encoder/code converter 24 has the following conditions precedent:

The image sensor 10 is provided with a Bayer array color filter having three primary colors R (red), G (green), and B (blue) as illustrated in FIG. 4A.

Figure 4B:
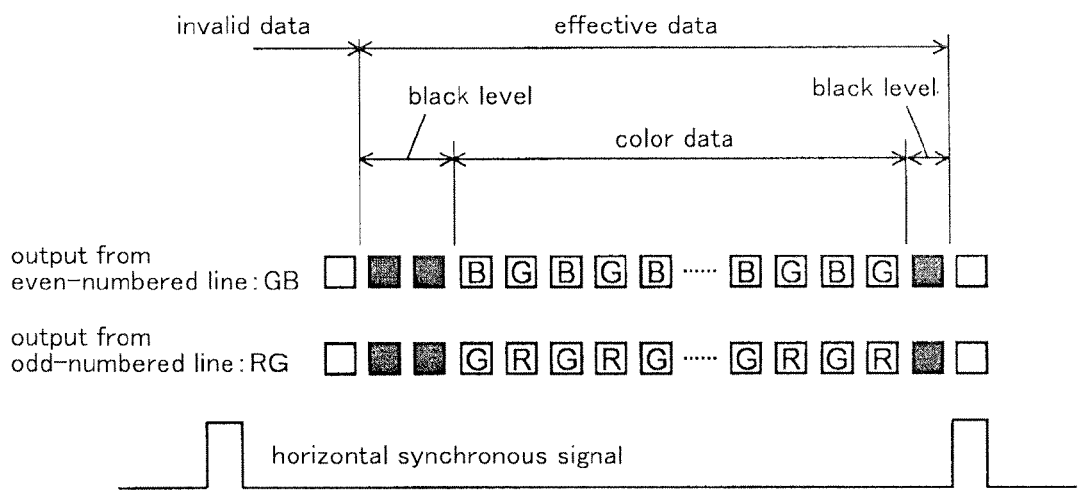
FIG. 4B is an illustration of a color data output format according to the exemplary embodiment 1.

As illustrated in FIG. 4B, horizontal scan image signals in even-numbered lines and horizontal scan image signals in odd-numbered lines are alternately scanned in a vertical direction, in which case the delay amount of the first delay unit 54 is equal to a clock cycle (one sampling clock cycle in the CDS 21).

Two kinds of color data alternately repetitive in one line (G data and R data, or B data and G data) are respectively generalized as data a) and data b).

Referring to FIG. 3B, an operation of the color difference type encoder/code converter 24 is schematically described. The 0 data inserter 51 inserts the 0 data at the leading position of a data row ($a_1, b_1, a_2, b_2, a_3, b_3, a_4, b_4 \ldots$) of the digital signal inputted from the AD converter 23 so that a 0 data inserted data row D1 ($0, a_1, b_1, a_2, b_2, a_3, b_3, a_4, b_4 \ldots$) is generated. The 0 data inserted data row D1 is variously processed by the first delay unit 54, first subtraction unit 55, positive/negative code reverser 53, and binary—gray code converter 42, so that a binary-gray code converted data row D4 ($a_1$-0, $a_1$-$b_1$, $a_2$-$b_1$, $a_2$-$b_2$, $a_3$-$b_2$, $a_3$-$b_3$, $a_4$-$b_3$, $a_4$-$b_4$, ...) is generated. The binary-gray code converted data row D4 is an example of the second color difference data. The binary-gray code converted data row D4 (except $a_1$-0 at the top) is an example of R1–G1, R2–G1, R2–G2, R3–G2, R3–G3, R4–G3, R4–G4 ... in J) of FIG. 7 described later, that is, 100, 100, 100, 102, 101, 99, 100.

Figure 5A:
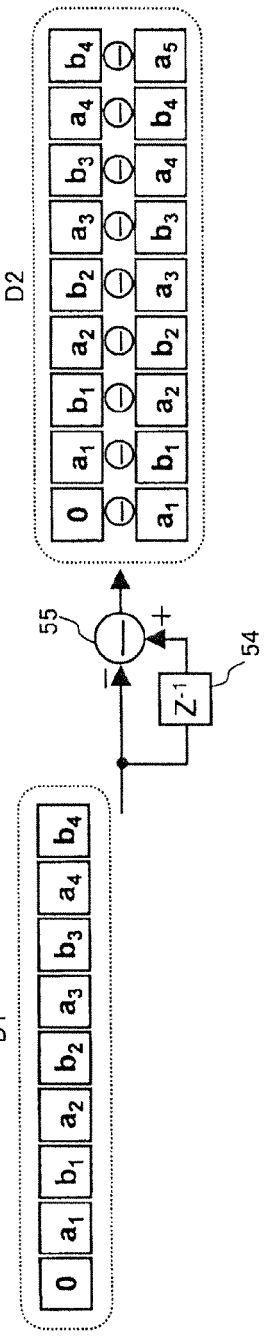
FIG. 5A is a detailed operation diagram (1) of the color difference type encoder/code converter according to the exemplary embodiment 1.
Figure 5B:
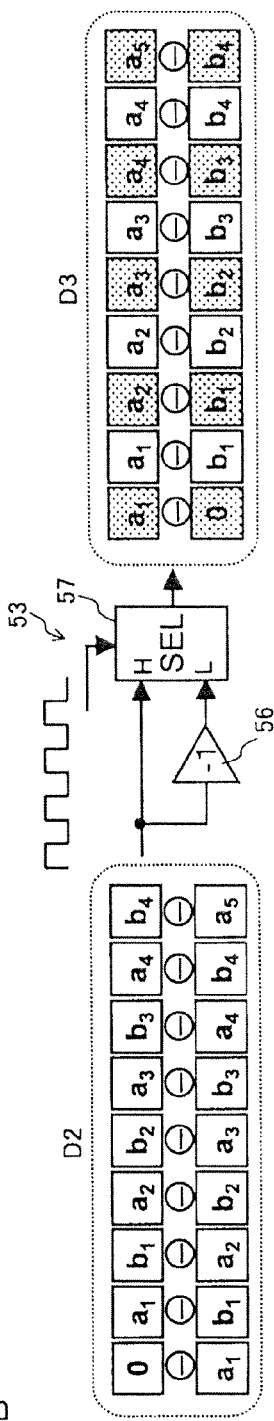
FIG. 5B is a detailed operation diagram (2) of the color difference type encoder/code converter according to the exemplary embodiment 1.
Figure 5C:
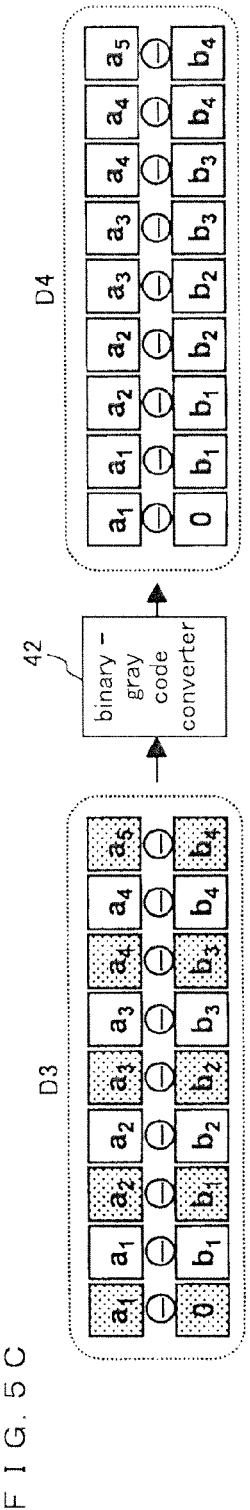
FIG. 5C is a detailed operation diagram (3) of the color difference type encoder/code converter according to the exemplary embodiment 1.

FIGS. 5 illustrate in detail the operation diagram of FIG. 3B in a chronological order. FIG. 5A illustrates the operations of the first delay unit 54 and the first subtraction unit 55. FIG. 5B illustrates the operation of the positive/negative code reverser 53. FIG. 5C illustrates the operation of the binary-gray code converter 42.

First, the operations of the first delay unit 54 and the first subtraction unit 55 are described referring to FIG. 5A. These operations calculate a code differential between adjacent pixels in a data row having different color information per pixel of the digital signal so that the first reversed color difference data is generated.

The first delay unit 54 delays the 0 data inserted data row D1 (0, $a_1$, $b_1$, $a_2$, $b_2$, $a_3$, $b_3$, $a_4$, $b_4$ ...) of the digital signal by a clock cycle and outputs the resulting data row D1 to the first subtraction unit 55. The first subtraction unit 55 calculates differentials between the 0 data inserted data row D1 (0, $a_1$, $b_1$, $a_2$, $b_2$, $a_3$, $b_3$, $a_4$, $b_4$ ...) and the data row delayed by a clock cycle, which is illustrated in FIG. 5A. An input data row on the left of the drawing is the 0 data inserted data row D1 (0, $a_1$, $b_1$, $a_2$, $b_2$, $a_3$, $b_3$, $a_4$, $b_4$ ...). An output data row on the right is a differentiated data row D2. Of the differentiated data row D2, a lower data row is the current data row, while an upper data row is the delayed data row. The differentials are respectively calculated by the calculation formula; differential= (delayed data)−(current data)=(data in upper row)−(data in lower row).

Assigning the delayed data row (0, $a_1$, $b_1$, $a_2$, $b_2$, $a_3$, $b_3$, $a_4$, $b_4$ ...) and the current data row ($a_1$, $b_1$, $a_2$, $b_2$, $a_3$, $b_3$, $a_4$, $b_4$ ...) to the calculation formula, the differentiated data row D2 results in (0-$a_1$, $a_1$-$b_1$, $b_1$-$a_2$, $a_2$-$b_2$, $b_2$-$a_3$, $a_3$-$b_3$, $b_3$-$a_4$, $a_4$-$b_4$ ...). The differentiated data row D2 thus calculated is the first reversed color difference data. Thus, the differentiated data row D2 results in a data row format where (a-b) and (b-a) are alternately repeated. The differentiated data row D2, in which a data is subtracted from another data in one cycle and a different data is then subtracted from the data in a next cycle, is a color difference data alternately including the positive/negative codes per pixel clock. The differentiated data row D2, though the positive/negative codes are alternately repeated per pixel clock therein, is just one color difference data.

The prior art calculates a code differential between adjacent pixel codes of the same color, whereas the present exemplary embodiment calculates a differential between adjacent data in the data row having different color information per pixel. This is the technical feature of the present exemplary embodiment different to that of the prior art. The term used in the present exemplary embodiment, "color difference data", represents the distinctive technical feature. The prior art focusing on differentiating pixels of the same color is irrelevant to any color difference. This distinctive technical feature is similarly applicable to "color difference type" in the color difference type encoder/code converter 24 and the color different type differentiator 52.

Next, the operation of the positive/negative code reverser 53 is described referring to FIG. 5B. An input data row on the left of the drawing is the differentiated data row D2 as the first reversed color difference data where the positive/negative codes are alternately arranged per pixel clock. The differentiated data row D2 is inputted to an "H" selection input terminal of the selector 57. An inverse data row D2' (=−D2) obtained through inversion by the amplifier 56 (gain coefficient: −1) is inputted to an "L" selection input terminal of the selector 57. The selector 57 selects and outputs in turns one of the data inputted to the "H" selection input terminal and the data inputted to the "L" selection input terminal per clock cycle based on a selection control signal supplied from the frequency ½ divider 58. As a result, a code-adjusted data row D3 outputted from the positive/negative code reverser 53 results in ($a_1$-0, $a_2$-$b_1$, $a_4$-$b_3$, $a_4$-$b_4$ ...). The code-adjusted data row D3 is a data row constituting the first color difference data. All of the data in the code-adjusted data row D3 have the format of (a-b). The first reversed color difference data (differentiated data row D2) is transformed into the first color difference data including the code-adjusted data row D3 (just one uninterrupted color difference data row uniformly including the positive/negative codes.

Next, the operation of the binary-gray code converter 42 is described referring to FIG. 5C. An input data row on the left in FIG. 5C is the first color difference data (code-adjusted data row D3 uniformly including the positive/negative codes). The binary-gray code converter 42 performs the binary-gray code conversion to the first color difference data having the binary code format (code-adjusted data row D3). As a result, the first color difference data (code-adjusted data row D3) is converted into the data row D4 which is the second color difference data having the gray code format. The data row D4 has a smaller number of changing bits in switching between the codes as compared to the code-adjusted data row D3. The number of changing bits in switching between the codes is number of bits that change when a code is changed to a next code.

FIG. 6 is a circuit diagram illustrating in detail a structure of the binary-gray code converter 42. The binary-gray code converter 42 includes a plurality of exclusive OR gates. The number of the exclusive OR gates is less by 1 than the number of bits of the code to be converted. In an example given here where the code to be converted has eight bits, the binary-gray code converter 42 has seven exclusive OR gates G1–G7.

The exclusive OR gate G1 calculates an exclusive OR between a first bit d0 and a second bit d1 and outputs the obtained value as a post-conversion first bit d0'. The exclusive OR gate G2 calculates an exclusive OR between the second bit d1 and a third bit d2 and outputs the obtained value as a post-conversion second bit d1'. The other exclusive OR gates similarly calculate respective exclusive ORs, and finally, the exclusive OR gate G7 calculates an exclusive OR between a seventh bit d6 and an eighth bit d7 and outputs the obtained value as a post-conversion seventh bit d6'. The most significant eighth bit d7 is not subjected to the calculation of an exclusive OR with any other bit, and its current value is directly outputted as a post-conversion eighth bit d7'.

The circuit configuration illustrated in FIG. 6 is a circuit example for converting the first color difference data having the 8-bit binary code into the second color difference data having the gray code format. Any code converters of arbitrary bit numbers, such as a 10-bit coder converter and a 12-bit code converter, can be similarly configured.

Figure 7:
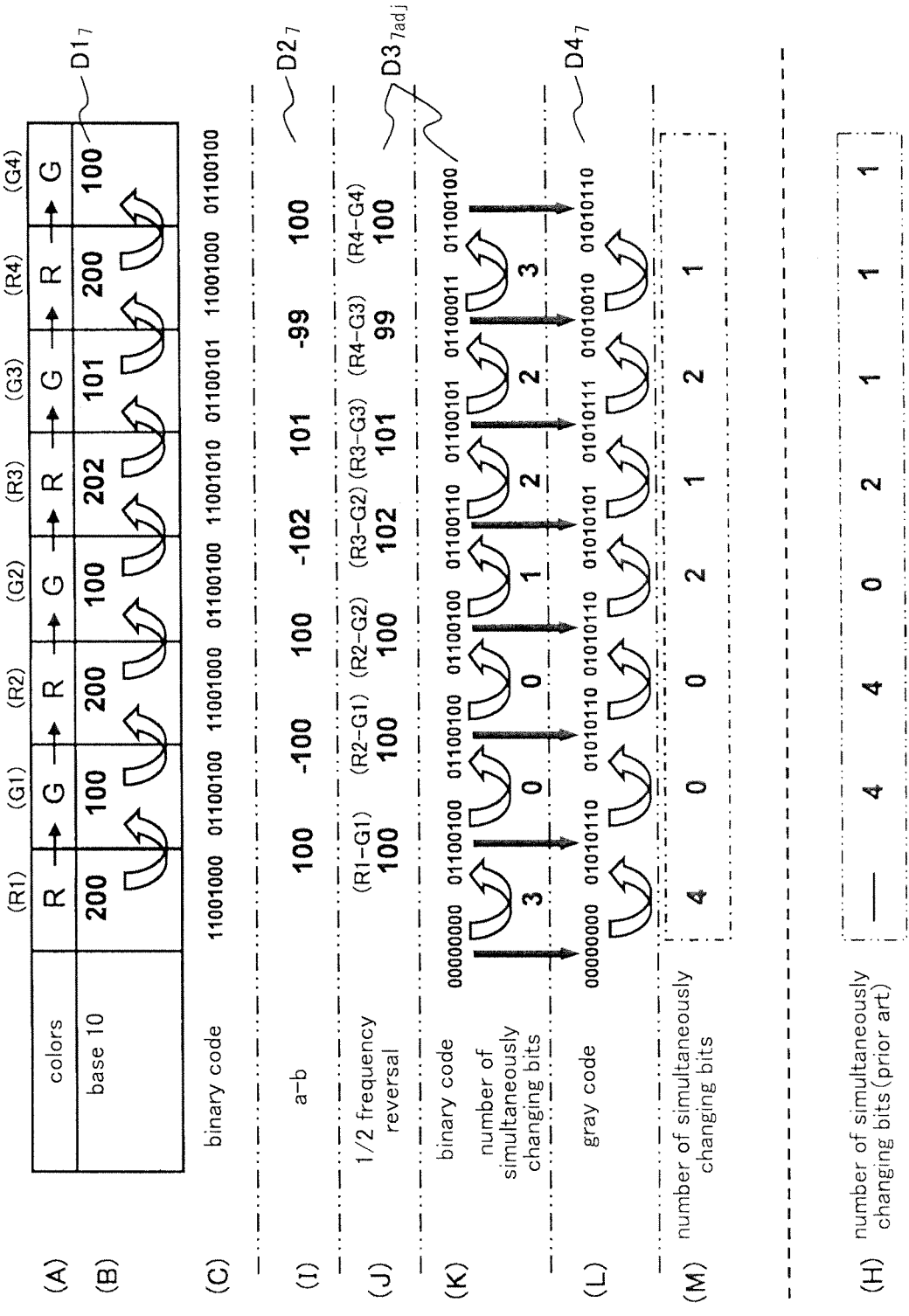
FIG. 7 is a detailed illustration (1) of the operation of the color difference type encoder/code converter according to the exemplary embodiment 1.
Figure 8:
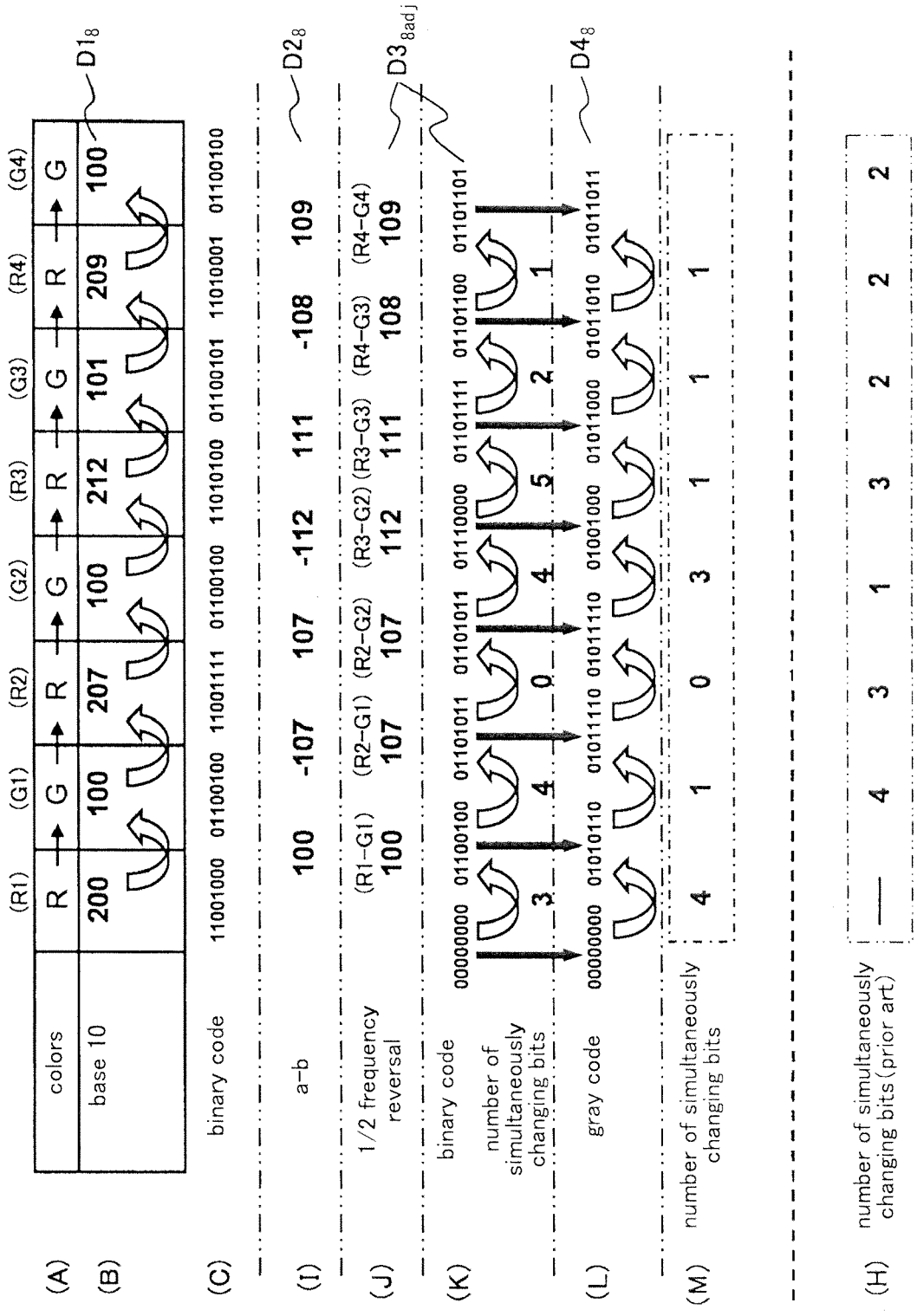
FIG. 8 is a detailed illustration (2) of the operation of the color difference type encoder/code converter according to the exemplary embodiment 1.

Referring to FIGS. 7, 8, and 9, specific examples of the operation of the color difference type encoder/code converter 24 are described in detail. FIG. 7 illustrates an operation for a red-based monochromatic digital signal with no gradation change (color data) where levels of R signal data row and G signal data row alternately inputted are G level<R level in a manner similar to the illustration of A) of FIG. 18 according to the prior art. FIG. 8 illustrates an operation for a red-based monochromatic digital signal (color data) where data rows have gradation change. FIG. 9 is a table illustrating a correspondence relationship among base 10, binary code, and gray code (partly excerpted). First, the operation for the digital signal illustrated in FIG. 7 (color data) is described, followed by description of the operation for the digital signal illustrated in FIG. 8 (color data).

1) Operation of FIG. 7

Figure 18:
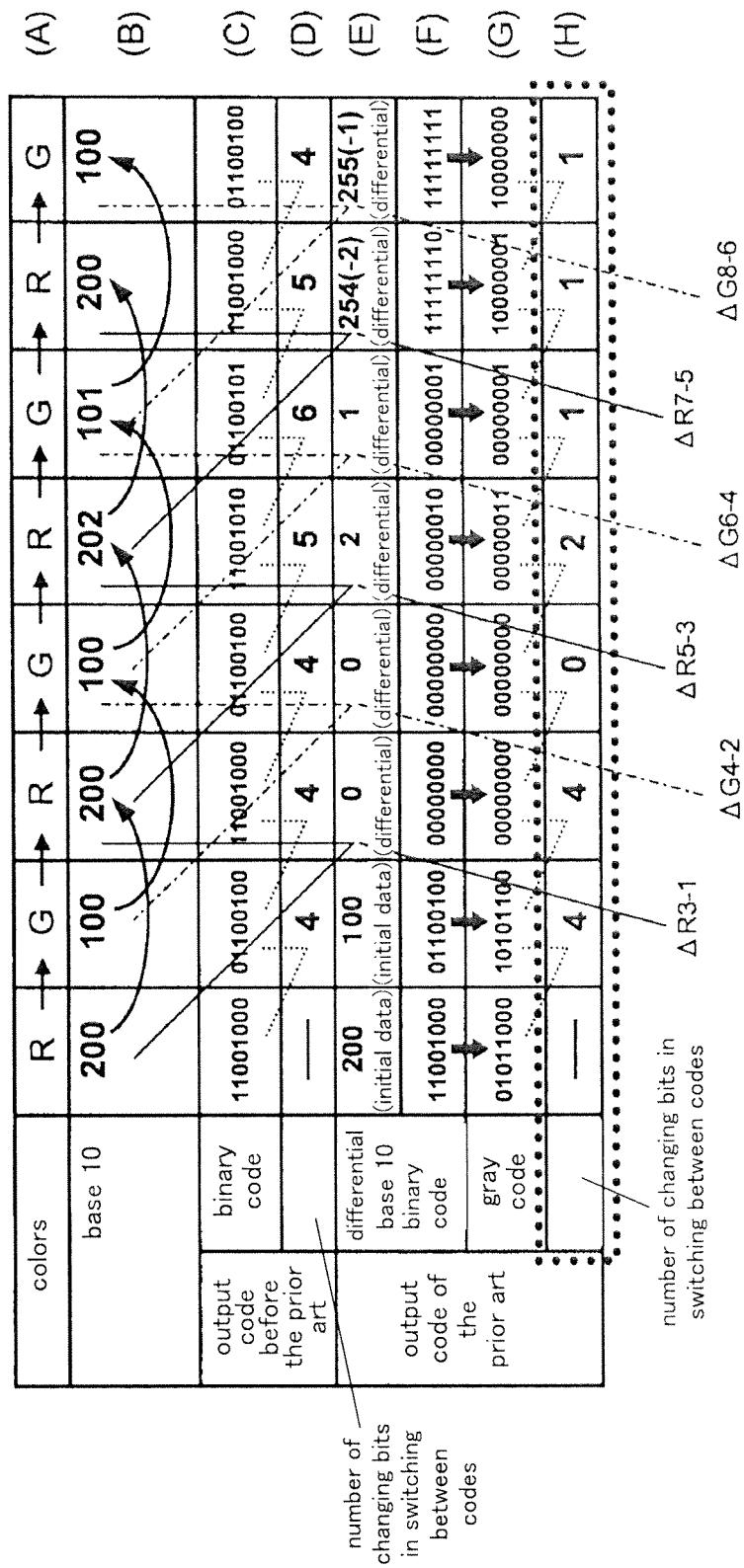
FIG. 18 is a detailed operation diagram (1) of the conventional encoder/code converter.
Figure 20:
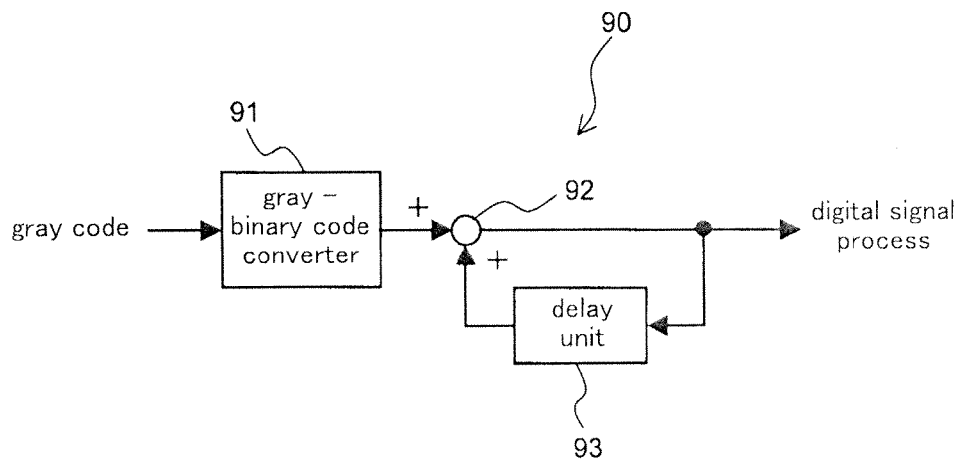
FIG. 20 is a block diagram illustrating a structure of a conventional code inverse converter.
Figure 21:
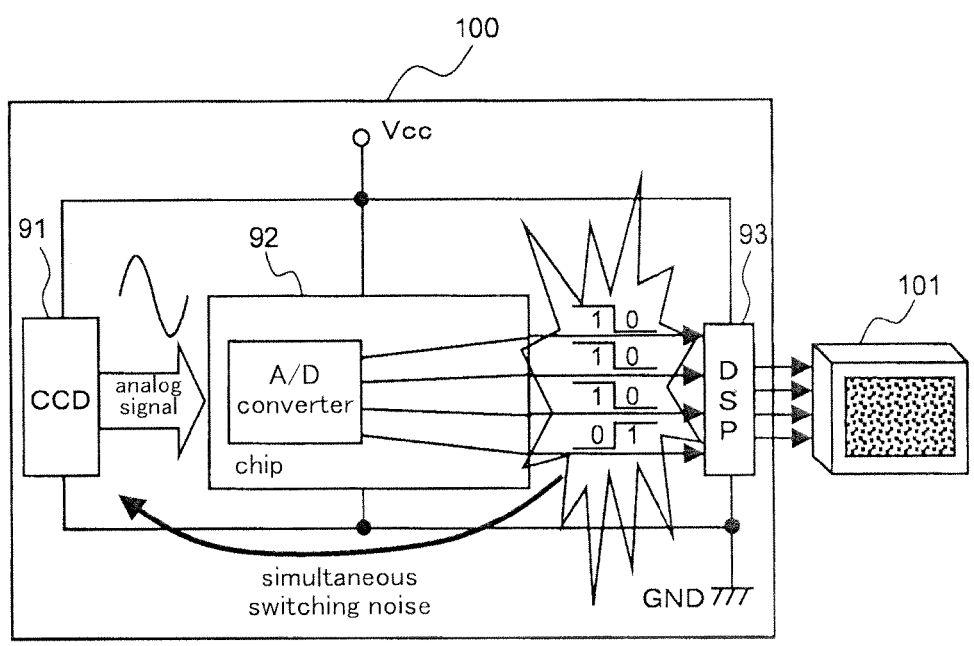
FIG. 21 is an illustration of technical problems of a conventional imaging system (electronic still camera or video camera) solved by the prior art.

In the operation of FIG. 7, an inputted digital signal (data row) is (200, 100, 200, 100, 202, 101, 200, 100, . . . ) similarly to A) illustrated in FIG. 8 (operation according to the prior art). The digital signal (data row) is a red-based monochromatic digital signal with no gradation change (color data) where R and G are alternately inputted, and R level is larger than G level. The AD-converted value of each color changes (base 10) as illustrated in B) of FIG. 18. C) of FIG. 18 illustrates a digital signal (binary code format) actually outputted. So far described is similar to the conditions according to the prior art As illustrated in I) of FIG. 7, the first delay unit 54 and the first subtraction unit 55 of the color difference type encoder/code converter 24 collaborate with each other to differentiate the digital signal to thereby generate the first reversed color difference data including the color difference differentiated data where the positive/negative codes are alternately arranged per pixel clock. The first reversed color difference data in I) of FIG. 7 includes a differentiated data row $D2_7$ (100, −100, 100, −102, 101, −99, 100, . . . ). The differentiated data row $D2_7$ is just one color difference data though the positive/negative codes are alternately arranged therein per pixel clock.

As illustrated in J) of FIG. 7, the positive/negative code reverser 53 reverses the positive/negative codes of the first reversed color difference data (differentiated data row $D2_7$) per data to thereby generate the first color difference data including the color difference binary data where the positive/negative codes are uniformly arranged (data reversal). The first color difference data in J) of FIG. 7 includes a code-adjusted data row $D3_{7adj}$ (100, 100, 100, 102, 101, 99, 100, . . . ). The code-adjusted data row $D3_{7adj}$ is just one uninterrupted color difference data row where the positive/negative codes are regularly arranged. FIG. 7 K) illustrates the first color difference data (code-adjusted data row $D3_{7adj}$) expressed in the binary code format. Though not particularly described so far not to create complexity in the description, the first color difference data (code-adjusted data row $D3_{7adj}$) already has the 0 data inserted therein by the 0 data inserter 51, and K) of FIG. 7 illustrates the binary code with 0 data inserted therein. The insertion of 0 data is effective in A)-J) of FIG. 7.

As illustrated in L) of FIG. 7, the binary-gray code converter 42 performs the binary-gray code conversion to the first color difference data (code-adjusted data row $D3_{7adj}$) so that the second color difference data (data row $D4_7$) having the gray code format is obtained. The second color difference data (data row $D4_7$) has only a small number of changing bits in switching between the codes, which is comparable to a result obtained by comparing the adjacent codes in L).

As is clear from the comparison of the number of changing bits in switching between the codes in M) of FIG. 7 (present exemplary embodiment) to the number of changing bits in switching between the codes in H) of FIG. 18 (prior art), the operation according to the present exemplary embodiment exerts an effect equal to that of the prior art. The number of changing bits in switching between the codes in the operation according to the present exemplary embodiment (4, 0, 0, 2, 1, 2, 1) in total is "10". The number of changing bits in switching between the codes according to the prior art (4, 4, 0, 2, 1, 1, 1) in total is "13". Thus, the present exemplary embodiment can make some improvement.

2) Operation of FIG. 8

In the operation of FIG. 8, an input data row of the digital signal is (200, 100, 207, 100, 212, 101, 209, 100, . . . ). The color data of the digital signal is red-based monochromatic but having gradation change, which is different to the digital signal illustrated in FIG. 7 (red-based monochromatic color data with no gradation change).

As illustrated in I) of FIG. 8, the first delay unit 54 and the first subtraction unit 55 of the color difference type encoder/code converter 24 collaborate with each other to differentiate the digital signal to thereby generate the first reversed color difference data alternately including the positive/negative codes per pixel clock. The first reversed color difference data includes a differentiated data row $D2_8$ (100, −107, 107, −112, 111, −108, 109, . . . ).

As illustrated in J) of FIG. 8, the positive/negative code reverser 53 reverses the positive/negative codes of the first reversed color difference data (differentiated data row $D2_8$) per data to thereby generate the first color difference data having the binary code where the positive/negative codes are uniformly arranged (data reversal). The first color difference data thereby obtained is a code-adjusted data row $D3_{8adj}$ (100, 107, 107, 112, 111, 108, 100, . . . ). K) of FIG. 8 illustrates the first color difference data (code-adjusted data row $D3_{8adj}$) expressed in the binary code format. The first color difference data (code-adjusted data row $D3_{8adj}$) illustrated in K) of FIG. 8 already has the 0 data inserted therein.

According to the binary code of the first color difference data (code-adjusted data row $D3_{8adj}$) illustrated in K) of F*ig*. 8, the number of changing bits in switching between the adjacent pixels fluctuates as (3, 4, 0, 4, 5, 2, 1, . . . ). The number of changing bits in switching between the adjacent pixels is obviously larger than the number of changing bits in switching between the adjacent pixels (3, 0, 0, 1, 2, 2, 1, . . . ) in the binary code of the code-adjusted data row $D3_{7adj}$ illustrated in K) of FIG. 7. This increase is due to variable conditions for the bit conversion when a scene of nature monochromatic but having gradation change, for example, is imaged. When the variation of the differential values is thus increased, it still fails to reduce the number of changing bits although the gray code conversion is used as the code conversion, resulting in deterioration of a noise reduction effect as described in "problems to be solved by the invention". The present invention succeeds in solving the conventional problem, which is described below.

As illustrated in L) of FIG. 8, the binary-gray code converter 42 performs the binary gray code conversion to the first color difference data (code-adjusted data row $D3_{8adj}$) so that a data row $D4_8$ of the second color difference data with less number of changing bits in switching is obtained, which is comparable to a result obtained by comparing the adjacent codes in L).

Comparing the number of changing bits in switching between the codes recited in M) of FIG. 8 illustrating the operation according to the present exemplary embodiment to the number of changing bits recited in H) of FIG. 19 illustrating the operation according to the prior art, the operation according to the present exemplary embodiment is comparable to the operation of FIG. 7, proving that a remarkable effect is exerted as compared to the prior art. The number of changing bits in switching between the codes in the operation according to the present exemplary embodiment (4, 1, 0, 3, 1, 1, 1) in total is "11". The number of changing bits in switching between the codes according to the prior art (4, 3, 1, 3, 2, 2, 2) in total is "13". Thus, the present exemplary embodiment can make a significant improvement.

As described so far, the color difference type encoder/code converter 24 calculates a differential between the data of two colors to thereby generate the first reversed color difference data, and uniformly arranges the positive/negative codes representing the data differentials of the first reversed color difference data to thereby generate the first color difference data. The color difference type encoder/code converter 24 further converts the code format of the first color difference data (binary code format) into the gray code format to thereby generate the second color difference data. The differentials of the first reversed color difference data created during the production of the second color difference data having the gray code format are not very variable in different colors. As a result, the number of changing bits when the first color difference data is switched to the second color difference data in image data with smooth gradation can be lessened as compared to the prior art.

The color difference data decoder 31 of the DSP 30 is described below. The DSP 30 is responsible for data processes including decoding the image data (including the second color difference data) outputted from the analog front-end device 20. The decoding process carried out by the color difference data decoder 31 requires an inverse process which is contrary to the process carried out by the color difference type encoder/code converter 24 to process the second color difference data back into the first color difference data.

Figure 10:
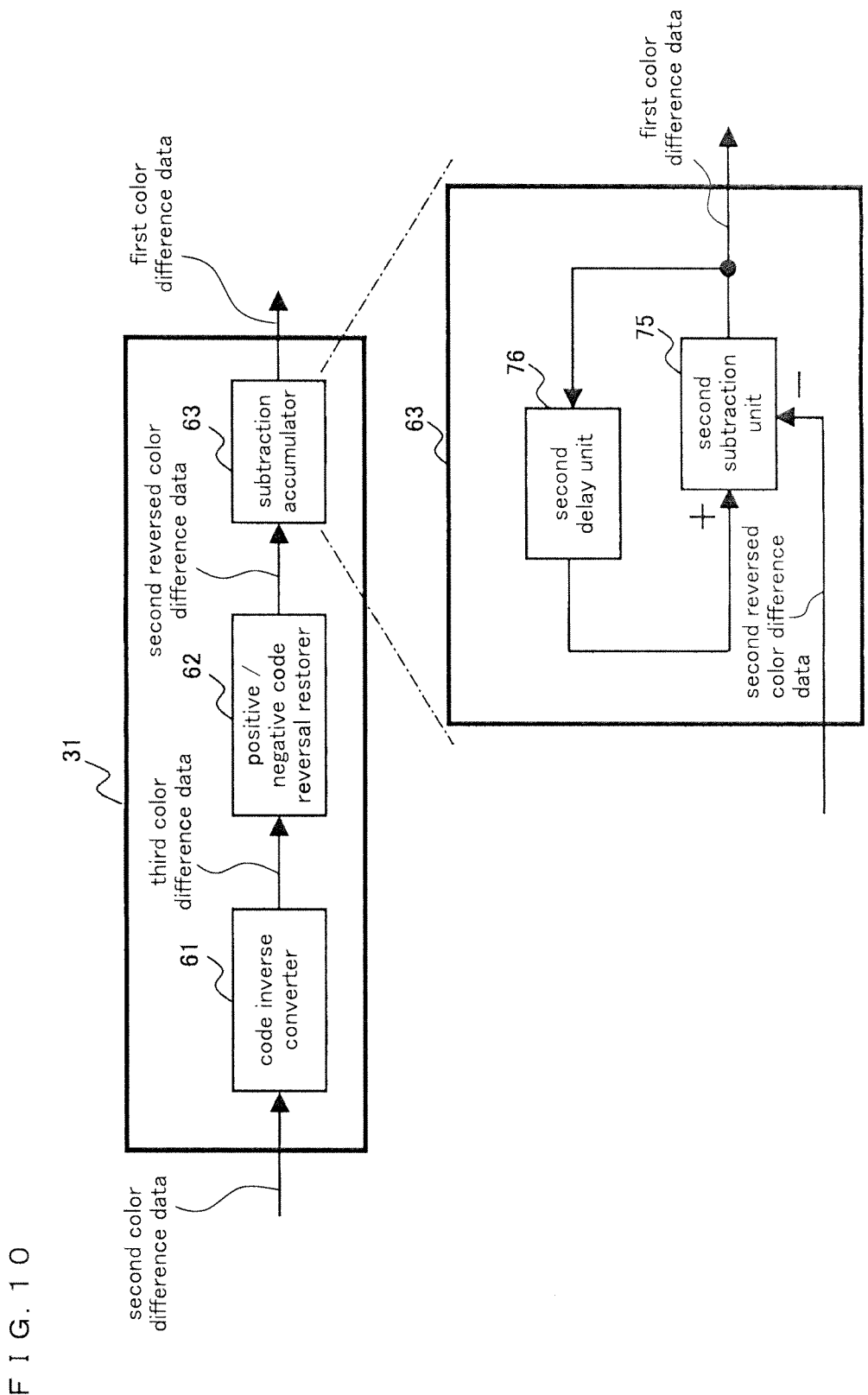
FIG. 10 is a block diagram illustrating in detail a structure of a color difference data decoder according to the exemplary embodiment 1.

FIG. 10 is a block diagram illustrating in detail a structure of the color difference data decoder 31. The color difference data decoder 31 has a code inverse converter (gray-binary code converter) 61, a positive/negative code reversal restorer 62, and a subtraction accumulator 63. The code inverse converter 61 inversely converts the second color difference data (gray code format) outputted from the analog front-end device 20 into the third color difference data (binary code format). The third color difference data generated by the code inverse converter 61 has the positive/negative codes uniformly arranged. The positive/negative code reversal restorer 62 reverses the positive/negative codes of the third color difference data per pixel to thereby generate the second reversed color difference data. The subtraction accumulator 63 performs the subtraction and accumulation to the second reversed color difference data where the positive/negative codes are reversed per pixel to thereby decode the second reversed color difference data into the original first color difference data.

The color difference data decoder 31 has the code inverse converter (gray-binary code converter) 61, positive / negative code reversal restorer 62, and subtraction accumulator 63. The subtraction accumulator 63 has a second subtraction unit 75 to which the output data of the positive/negative code reversal restorer 62 is inputted, and a second delay unit 76 which delays a calculation result obtained by the second subtraction device 75. The output data of the positive/negative code reversal restorer 62 (second reversed color difference data) is delayed by the second delay unit 76 and then supplied to the second subtraction unit 75 as an input to be accumulated. The second delay unit 76 delays the data where the color information changes per pixel by a delay amount equal to a pixel clock.

Figure 11A:
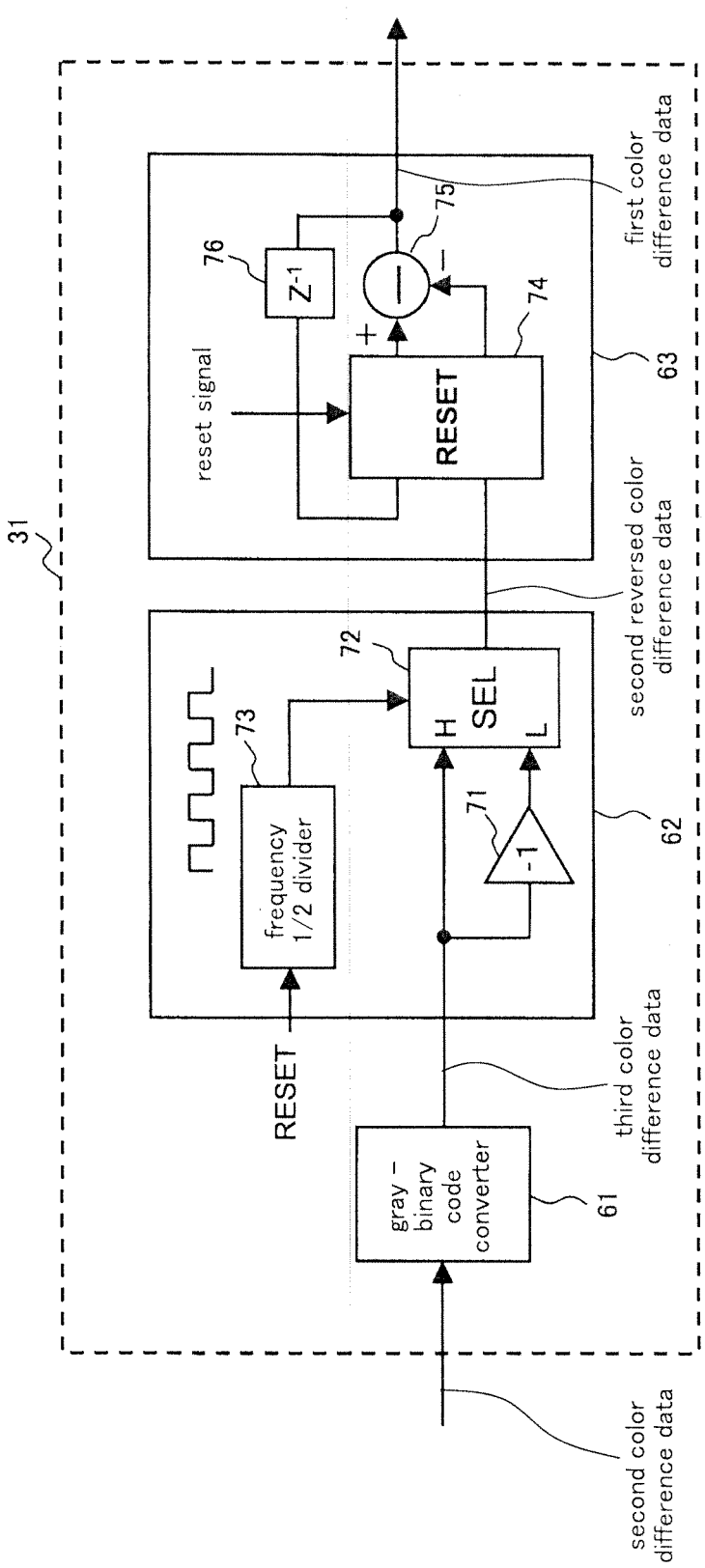
FIG. 11A is a block diagram illustrating in further detail the structure of a color difference data decoder according to the exemplary embodiment 1.

FIG. 11A is a block diagram illustrating in further detail the structure of the color difference data decoder 31. The color difference data decoder 31 has the gray-binary code converter 61, positive / negative code reversal restorer 62, and subtraction accumulator 63. The gray-binary code converter 61 decodes the second color difference data (gray code format) illustrated on the right side of FIG. 9 into the third color difference data illustrated on the left side of the drawing. The positive/negative code reversal restorer 62 has an amplifier 71, a selector 72, and a frequency ½ divider 73. The gain coefficient of the amplifier 71 is set to −1. The subtraction accumulator 63 has a resetter 74, a second subtraction unit 75, and a second delay unit 76.

Figure 11B:
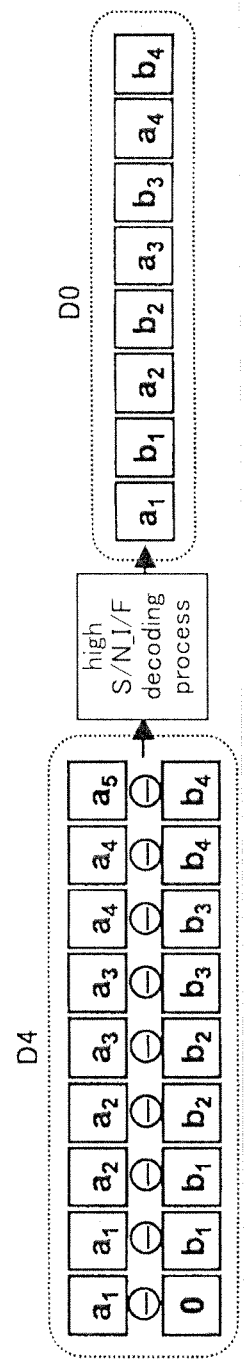
FIG. 11B is an operation diagram of the color difference data decoder according to the exemplary embodiment 1.

Referring to FIG. 11B, an operation of the color difference data decoder 31 is described below. The second color difference data (data row D4) is a data row having a code format with less number of changing bits in switching between the codes (gray code format). The second color difference data is outputted from the parallel data output unit 25 of the analog front-end device 20 to the gray-binary code converter 61. The gray-binary code converter 61 converts the second color difference data (data row D4) into the third color difference data (data row D0) having the binary code format. When the third color difference data is generated, the gray-binary code converter 61 removes the 0 data inserted by the 0 data inserter 51 from the data row D0.

FIG. 12 is a circuit diagram illustrating in detail a structure of the gray-binary code converter 61. The gray-binary code converter 61 has a plurality of exclusive OR gates. The number of the exclusive OR gates is less by 1 than the number of bits of the code to be converted. In an example given here where the code to be converted has eight bits, the binary-gray code converter 61 has seven exclusive OR gates G11–G17.

In the gray-binary code converter 61, an input data of an eighth bit d7', which is the most significant bit, is directly outputted as a post-conversion eighth bit data d7, and also inputted to the exclusive OR gate G17. The exclusive OR gate G17 calculates an exclusive OR between an input data d6' of a seventh bit and the input data d7' of the eighth bit and outputs the obtained value as a post-conversion output data d6 of the seventh bit, and also supplies the output data d6 to the exclusive OR gate G16. The exclusive OR gate G16 calculates an exclusive OR between an input data d5' of a sixth bit and the output data d6 of the seventh bit and outputs the obtained value as the post-conversion output data d6 of the seventh bit, and also supplies the output data d6 to the exclusive OR gate G15. The other exclusive OR gates similarly calculate respective exclusive ORs, and finally, the exclusive OR gate G12 calculates an exclusive OR between an input data d1' of a second bit and an output data d2 of a third bit (output of the exclusive OR gate G13) and outputs the obtained value as a post-conversion second bit d1. The exclusive OR gate G11 calculates an exclusive OR between an input data d0' of a first bit and an output data dl of the second bit (output of the exclusive OR gate G12) and outputs the obtained value as a post-conversion first bit d0.

By processing the data as described so far, the gray-binary code converter 61 coverts the second color difference data (data row D4) into the third color difference data having the binary code format. FIG. 12 illustrates an example when the 8-bit second color difference data having the gray code format is converted into the third color difference data having the binary code format. Any code converters of arbitrary bit numbers, such as a 10-bit coder converter and a 12-bit code converter, can be similarly configured.

Figure 13A:
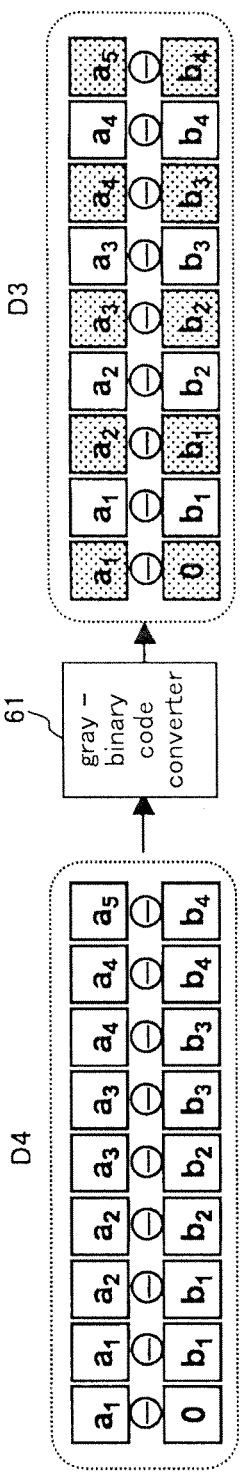
FIG. 13A is a detailed operation diagram (1) of the color difference data decoder according to the exemplary embodiment 1.
Figure 13B:
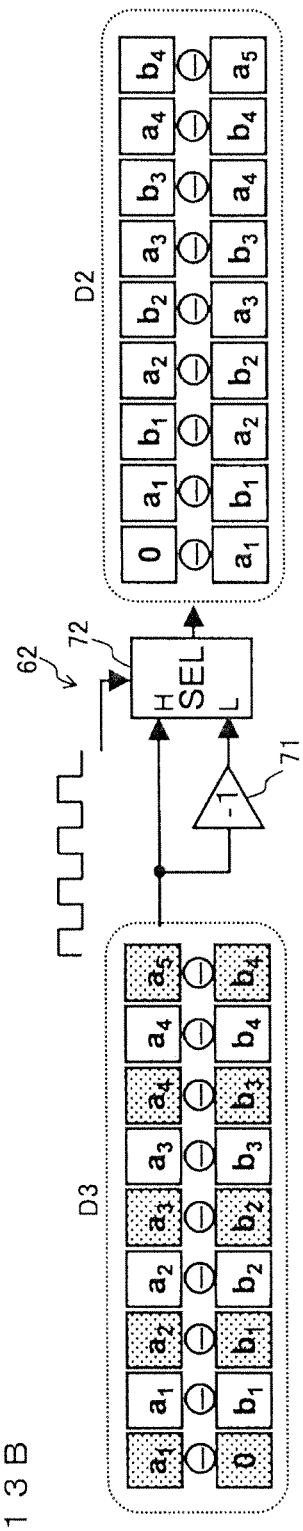
FIG. 13B is a detailed operation diagram (2) of the color difference data decoder according to the exemplary embodiment 1.
Figure 13C:
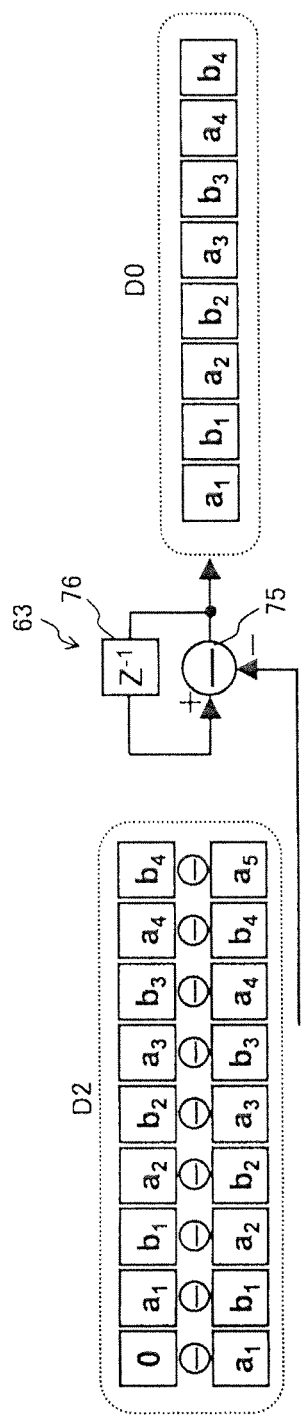
FIG. 13C is a detailed operation diagram (3) of the color difference data decoder according to the exemplary embodiment 1.

FIGS. 13A-13C illustrate in detail the operation of FIG. 11B in a chronological order. FIG. 13A is an operation diagram of the gray-binary code converter 61. FIG. 13B is an operation diagram of the positive/negative code reversal restorer 62. FIG. 13C is an operation diagram of the subtraction accumulator 63.

As illustrated in FIG. 13A, the gray-binary code converter 61 converts the second color difference data (data row D4) having the gray code format into the third color difference data (data row D3) having the binary code format. The second color difference data (data row D4) is a data row with less number of changing bits in switching between the codes. The third color difference data (data row D3) is ($a_1$-0, $a_1$-$b_1$, $a_2$-$b_1$, $a_2$-$b_2$, $a_3$-$b_2$, $a_3$-$b_3$, $a_4$-$b_3$, $a_4$-$b_4$ . . . ), where the positive/negative codes are uniformly arranged.

As illustrated in FIG. 13B, the positive/negative code reversal restorer 62 converts the third color difference data (data row D3) into the second reversed color difference data (data row D2) where the positive/negative codes are alternately arranged per pixel clock. More specifically, the third color difference data (data row D3) is inputted to an "H" selection input terminal of the selector 72 and also supplied to the amplifier 71 (gain coefficient−1) for the reversal operation, and a reversed data row D3' (=−D3) is inputted to an "L" selection input terminal of the selector 72. The selector 72 selects in turns the data inputted to the "L" selection input terminal and the data inputted to the "H" selection input terminal per clock cycle based on a selection control signal supplied from the frequency ½ divider 73. As a result, the differentiated data row D2 (0-$a_1$, $a_1$-$b_1$, $b_1$-$a_2$, $a_2$-$b_2$, $b_2$-$a_3$, $a_3$-$b_3$, $b_3$-$a_4$, $a_4$-$b_4$ . . . ), which is the second reversed color difference data, is outputted from the selector 72. The data row D2 is a color difference data row where the positive/negative codes are alternately arranged per pixel clock.

As illustrated in FIG. 13C, the second subtraction unit 75 reverses the positive/negative codes of the second reversed color difference data (data row D2) to thereby generate a reversed data row D2" ($a_1$-0, $b_1$-$a_1$, $a_2$-$b_1$, $b_2$-$a_2$, $a_3$-$b_2$, $b_3$-$a_3$, $a_4$-$b_3$, $b_4$-$a_4$ . . . ). The second delay unit 76 delays the reversed data row D2" by a pixel clock and supplies the delayed data row to the second subtraction unit 75. The second subtraction unit 75 performs the subtraction of "D2"−D2" ($a_1$-0, $b_1$-$a_1$, $a_2$$b_1$, $b_2$-$a_2$, $a_3$-$b_2$, $b_3$-$a_3$, $a_4$-$b_3$, $b_4$-$a_4$ . . . )−(0-$a_1$, $a_1$-$b_1$, $b_1$-$a_2$, $a_2$-$b_2$, $b_2$-$a_3$, $a_3$-$b_3$, $b_3$-$a_4$, $a_4$-$b_4$ . . . ) to thereby generate the data row D0 ($a_1$, $b_1$, $a_2$, $b_2$, $a_3$, $b_3$, $a_4$, $b_4$ . . . ) which is the first color difference data. The color difference data (data row D0) thus decoded is the same data as the original first color difference data (original data row D0) from which the inserted 0 data is already removed. The resetter 74 removes the 0 data previously inserted to count a timing of processing start. The data row D0 has two different color data alternately repeated. A position where the output data retrieved from the subtraction accumulator 63 to be used for decoding may be on the output side of the second delay unit 76.

Exemplary Embodiment 2

Figures 14A, 14B:
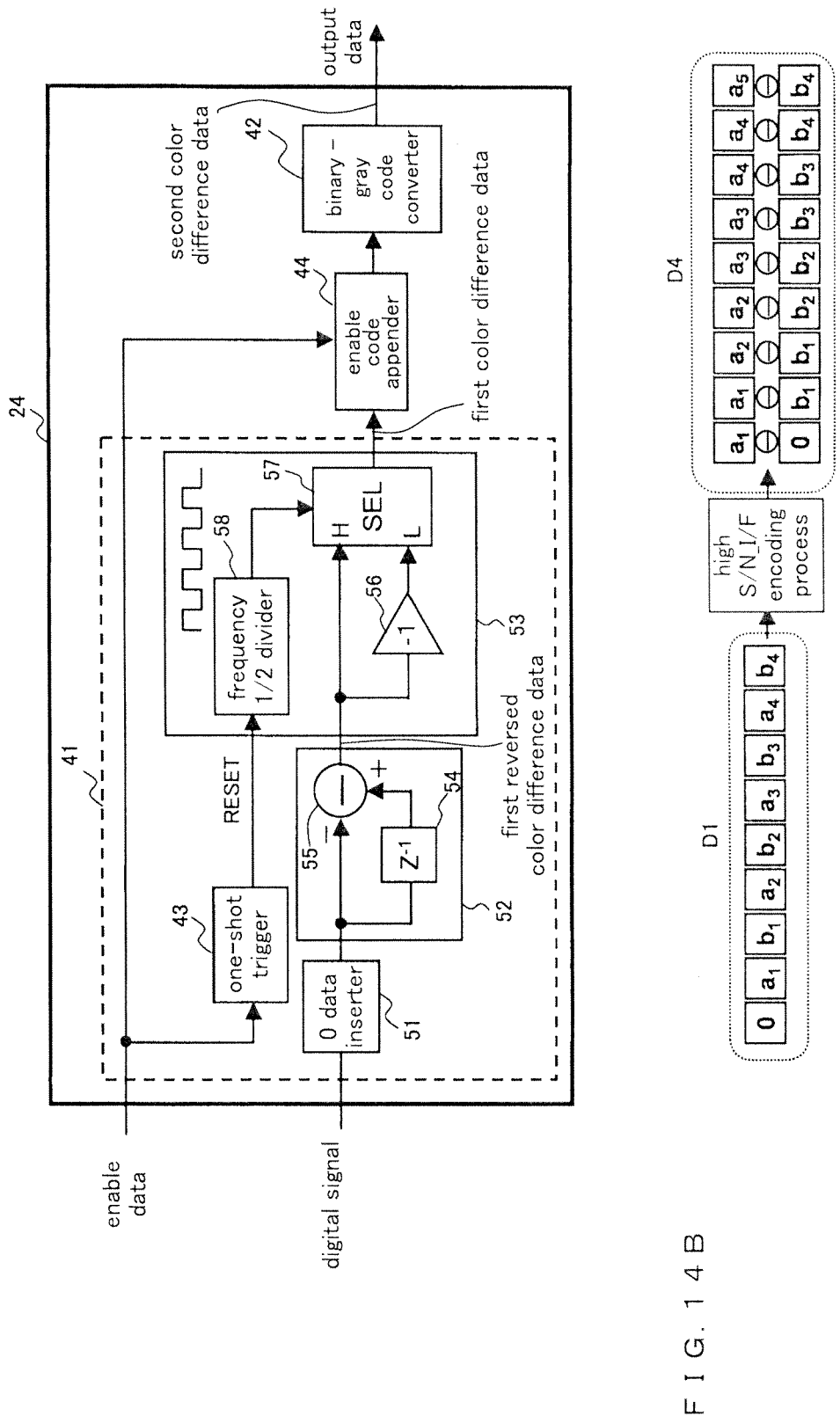
FIG. 14A is a block diagram illustrating in detail a structure of a color difference type encoder/code converter according to an exemplary embodiment 2 of the present invention.
FIG. 14B is an operation diagram of the color difference type encoder/code converter according to the exemplary embodiment 2.

FIG. 14A is a block diagram illustrating in detail a structure of a color difference type encoder/code converter 24 according to an exemplary embodiment 2 of the present invention. FIG. 15A is a block diagram illustrating in detail a structure of a color difference data decoder 31 according to the exemplary embodiment 2. The same reference symbols illustrated in FIG. 14A as those of FIG. 3A according to the exemplary embodiment 1 denote the same structural elements. The same reference symbols illustrated in FIG. 15A as those of FIG. 11A according to the exemplary embodiment 1 denote the same structural elements.

The color difference type encoder/code converter 24 has a one-shot trigger 43 and an enable code appender 44. The one-shot trigger 43 generates a reset signal based on a data enable signal. The enable code appender 44 is interposed between the selector 57 and the binary-gray code converter 42 and controlled by the data enable signal.

The one-short trigger 46 generates the reset signal based on the data enable signal and supplies the generated reset signal to the frequency ½ divider 58. The enable code appender 44 appends an enable code to the data outputted from the selector 207 by an input timing of the data enable signal, and outputs the resulting data to the binary-gray coder converter 42.

The color difference decoder 31 further comprises an enable code decoder 64 connected to a subsequent stage of the gray-binary code converter 61. The enable code decoder 64 decodes the enable code and supplies the decoded enable code to the frequency ½ divider 73 and the resetter 74. The enable code is inversely converted into the binary code by the gray-binary code converter 61.

According to the present exemplary embodiment wherein the enable code is used, the decoded enable code is used as a reference timing of starting the decoding process so that the functions specific to the present exemplary embodiment can be exerted by any discretionary timing.

The rest of the structural characteristics and operations are similar to those of the exemplary embodiment 1, therefore, will not described again.

Industrial Applicability

The present invention provides an advantageous technology for improving an image quality by preventing propagation of a power supply noise generated when digital output data is transmitted in an imaging system and a semiconductor integrated circuit of the imaging system.

What is claimed is:

1. A semiconductor integrated circuit, comprising:
an amplifier configured to amplify an analog color image signal inputted from an imaging device;
an AD converter configured to convert the analog color image signal amplified by the amplifier into a digital signal;
an adjacent color difference data generator configured to calculate a differential between adjacent data having different color information in a data row per pixel of the digital signal to thereby generate a first color difference data having a first code format; and
a code converter configured to convert the first color difference data into a second color difference data having a second code format, wherein
the second code format is a code format where only a small number of bits change before and after the code conversion from the first code format.

2. The semiconductor integrated circuit as claimed in claim 1, wherein
the adjacent color difference data is a data uniformly including positive/negative codes, and
the adjacent color difference data generator comprises:
a color difference type differentiator configured to calculate the differential between the adjacent data in the data row having different color information per pixel of the digital signal to thereby generate a first reversed color difference data having the first code format and alternately including positive/negative codes per pixel clock; and
a positive/negative code reverser configured to reverse the positive/negative codes of the first reversed color difference data per data to thereby generate the first color difference data.

3. The semiconductor integrated circuit as claimed in claim 2, wherein the color difference type differentiator comprises:
a first delay unit configured to delay the digital signal by a delay amount equal to a pixel clock; and
a first subtraction unit configured to calculate a differential between the digital signal and the delayed digital signal obtained by the first delay unit.

4. The semiconductor integrated circuit as claimed in claim 2, wherein
the positive/negative code reverser reverses the positive/negative codes of the first reversed color difference data per data based on a frequency 1/2 control of a pixel clock phase-fixed with reference to an arbitrary phase position temporally forward in a horizontal direction of effective data in the digital signal to thereby generate the first color difference data.

5. The semiconductor integrated circuit as claimed in claim 2, wherein
the positive/negative code reverser reverses the positive/negative codes of the first reversed color difference data per data based on a frequency 1/2 control of a pixel clock phase-fixed with reference to an arbitrary phase position temporally forward in a vertical direction of the effective data in the digital signal to thereby generate the first color difference data.

6. The semiconductor integrated circuit as claimed in any of claims 3-5, wherein
the adjacent color difference data generator comprises a 0 data inserter, the 0 data inserter being provided before the color difference type differentiator to insert 0 data in a leading data section of the effective data in the digital signal.

7. The semiconductor integrated circuit as claimed in claim 1, wherein the first code format is binary code format, and the second code format is gray code format.

8. An imaging system, comprising a first semiconductor integrated circuit and a second semiconductor integrated circuit, wherein
the semiconductor integrated circuit as claimed in claim 1 is used as the first semiconductor integrated circuit,
the second semiconductor integrated circuit comprises a color difference data decoder and an image processor,
the color difference data decoder inversely converts the second color difference data outputted from the first semiconductor integrated circuit into the first color difference data, and
the image processor images-processes the first color difference data outputted from the color difference data decoder.

9. The imaging system as claimed in claim 8, wherein
the color difference data decoder comprises: a code inverse converter; a positive/negative code reversal restorer; and a subtraction accumulator, and
the code inverse converter is configured to decode the second color difference data outputted from the first semiconductor integrated circuit into a third color difference data having the first code format and uniformly including positive/negative codes,
the positive/negative code reversal restorer is configured to reverse the positive/negative codes of the third color difference data outputted from the code inverse converter per data to thereby generate a second reversed color difference data where the positive/negative codes are reversed per data, and
the subtraction accumulator is configured to accumulate the second reversed color difference data while calculating a differential between adjacent data thereof to thereby decode the second reversed color difference data into the first color difference data.

10. The imaging system as claimed in claim 9, wherein
the positive/negative code reversal restorer reverses the positive/negative codes of the first color difference data outputted from the code inverse converter per data based on a frequency 1/2 control of a pixel clock phase-fixed with reference to an arbitrary phase position temporally forward in a horizontal direction of effective data in the digital signal to thereby generate the second reversed color difference data.

11. The imaging system as claimed in claim 9, wherein
the positive/negative code reversal restorer reverses the positive/negative codes of the first color difference data outputted from the code inverse converter per data based on a frequency 1/2 control of a pixel clock phase-fixed with reference to an arbitrary phase position temporally forward in a vertical direction of the effective data in the digital signal to thereby generate the second reversed color difference data.

12. The imaging system as claimed in claim 9, wherein
the subtraction accumulator comprises:
a second subtraction unit configured to subtract the second reversed color difference data; and
a second delay unit configured to delay a processing result obtained by the subtraction unit, and
the second delay unit delays the processing result by a delay amount equal to a pixel clock when the color information of the second reversed color difference data changes per pixel, and supplies the delayed processing result as an input to be accumulated to the subtraction unit.

13. The imaging system as claimed in claim 9, wherein
the subtraction accumulator comprises a resetter configured to insert initial 0 data in the second reversed color difference data.

14. The imaging system as claimed in claim 9, further comprising:
an enable code appender provided before the code converter and configured to append by an arbitrary timing an enable code indicating a reference timing to the first color difference data; and
an enable code decoder provided behind the code inverse converter and configured to decode the enable code, wherein
the color difference data decoder sets a reference timing for starting the decoding based on the enable code decoded by the enable code decoder.

15. The imaging system as claimed in claim 9, wherein
the first code format is binary code format, and the second code format is gray code format.

16. A signal conversion method comprising steps of:
converting an analog color image signal into a digital signal;
calculating a differential between adjacent data in a data row having different color information per pixel of the digital signal to thereby generate a reversed color difference data having a first code format and alternately including positive/negative codes per pixel clock;
reversing the codes of the reversed color difference data per data, starting from a reference position arbitrarily provided in the reversed color difference data to thereby generate a first color difference data uniformly including the positive/negative codes; and
converting the first color difference data into a second color difference data having a second code format, wherein
the second code format is a code format where only a small number of bits change before and after the code conversion from the first code format.

* * * * *